(12) United States Patent
Borland et al.

(10) Patent No.: US 11,200,192 B2
(45) Date of Patent: Dec. 14, 2021

(54) MULTI-MODE SYSTEM ON A CHIP

(71) Applicant: Amazon Technologies, Inc., Seattle, WA (US)

(72) Inventors: David James Borland, Austin, TX (US); Mark Bradley Davis, Austin, TX (US)

(73) Assignee: Amazon Technologies. lac., Seattle, WA (US)

( * ) Notice: Subject to any disclaimer, the term of this patent is extended or adjusted under 35 U.S.C. 154(b) by 691 days.

(21) Appl. No.: 14/622,661

(22) Filed: Feb. 13, 2015

(65) Prior Publication Data

US 2016/0239454 A1   Aug. 18, 2016

(51) Int. Cl.
  G06F 13/00 (2006.01)
  G06F 13/42 (2006.01)
  G06F 13/38 (2006.01)

(52) U.S. Cl.
  CPC ........ G06F 13/4221 (2013.01); G06F 13/385 (2013.01)

(58) Field of Classification Search
  CPC ........................... G06F 13/385; G06F 13/4221
  USPC ....................................................... 710/104
  See application file for complete search history.

(56) References Cited

U.S. PATENT DOCUMENTS

| | | | |
|---|---|---|---|
| 7,412,588 B2 * | 8/2008 | Georgiou | G06F 15/167 710/306 |
| 7,783,788 B1 | 8/2010 | Quinn et al. | |
| 8,082,547 B1 | 12/2011 | Herington et al. | |
| 8,990,455 B1 | 3/2015 | Owen | |
| 9,264,384 B1 | 2/2016 | Sundaresan et al. | |
| 9,684,597 B1 | 6/2017 | Eiriksson | |
| 2004/0121797 A1 | 6/2004 | Gupta | |
| 2005/0144223 A1 | 6/2005 | Yang et al. | |
| 2006/0136929 A1 | 6/2006 | Miller et al. | |
| 2007/0094419 A1 | 4/2007 | Rajendran | |
| 2007/0209037 A1 | 9/2007 | Sato et al. | |
| 2007/0217439 A1 | 9/2007 | Lemaire et al. | |
| 2008/0086853 A1 | 4/2008 | Nanda et al. | |
| 2008/0122482 A1 | 5/2008 | Sato | |
| 2008/0172524 A1 | 7/2008 | Singh et al. | |

(Continued)

FOREIGN PATENT DOCUMENTS

| | | |
|---|---|---|
| JP | 0844581 | 2/1996 |
| JP | 2001290510 | 10/2001 |

(Continued)

OTHER PUBLICATIONS

U.S. Appl. No. 14/578,004, filed Dec. 19, 2014, Titled: System On a Chip Comprising Multiple Compute Sub Systems.

(Continued)

*Primary Examiner* — Chun Kuan Lee
(74) *Attorney, Agent, or Firm* — Weaver Austin Villeneuve & Sampson LLP

(57) ABSTRACT

A system on a chip (SoC) can be configured to operate in one of a plurality of modes. In a first mode, the SoC can be operated as a network compute subsystem to provide networking services only. In a second mode, the SoC can be operated as a server compute subsystem to provide compute services only. In a third mode, the SoC can be operated as a network compute subsystem and the server compute subsystem to provide both networking and compute services concurrently.

20 Claims, 14 Drawing Sheets

(56) References Cited

U.S. PATENT DOCUMENTS

| | | |
|---|---|---|
| 2009/0228684 A1 | 9/2009 | Ramesh et al. |
| 2011/0295967 A1* | 12/2011 | Wang .................. G06F 21/602 |
| | | 709/212 |
| 2012/0079155 A1* | 3/2012 | Damodaran ....... H03K 19/0016 |
| | | 710/244 |
| 2012/0259982 A1 | 10/2012 | Tatsubori et al. |
| 2013/0138836 A1 | 5/2013 | Cohen et al. |
| 2013/0268706 A1* | 10/2013 | Yun ....................... G06F 13/364 |
| | | 710/110 |
| 2014/0100837 A1 | 4/2014 | Heinen et al. |
| 2014/0101419 A1 | 4/2014 | Giddi et al. |
| 2014/0254388 A1 | 9/2014 | Kumar et al. |
| 2015/0039790 A1* | 2/2015 | Bonen ................... G06F 3/0653 |
| | | 710/57 |
| 2016/0154760 A9* | 6/2016 | Davis ................. G06F 15/7803 |
| | | 710/104 |

FOREIGN PATENT DOCUMENTS

| | | |
|---|---|---|
| JP | 2002132397 | 5/2002 |
| JP | 2003316752 | 11/2003 |
| JP | 2004040188 | 2/2004 |
| JP | 2005044361 | 2/2005 |
| JP | 2005512186 | 4/2005 |
| JP | 2007047986 | 2/2007 |
| JP | 2008044581 | 2/2008 |
| JP | 2009134576 | 6/2009 |
| JP | 2010518472 | 5/2010 |
| JP | 2011238231 | 11/2011 |
| JP | 2012038293 | 2/2012 |
| JP | 2014038652 | 2/2014 |
| JP | 6426846 | 11/2018 |
| JP | 6445710 | 12/2018 |
| WO | 2003029995 | 4/2003 |
| WO | 2005022380 | 3/2005 |

OTHER PUBLICATIONS

U.S. Appl. No. 14/578,010, filed Dec. 19, 2014, Titled: System On a Chip Comprising Reconfigurable Resources for Multiple Compute Sub Systems.

U.S. Appl. No. 14/623,914, filed Feb. 17, 2015, Titled: System On a Chip Comprising an I/O Steering Engine.

PCT/US2016/017832 , "International Search Report and Written Opinion", dated Dec. 15, 2016, 7 pages.

JP2017-542058 , "Notice of Decision to Grant", dated Nov. 5, 2018, 6 pages.

JP2017-542058 , "Office Action", dated Jul. 17, 2018, 6 pages.

\* cited by examiner

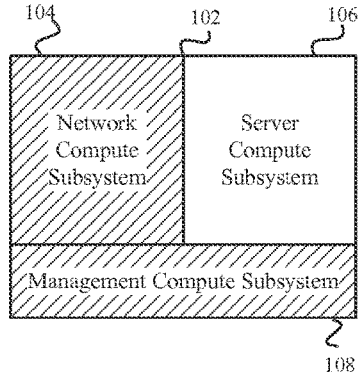
FIG. 3A
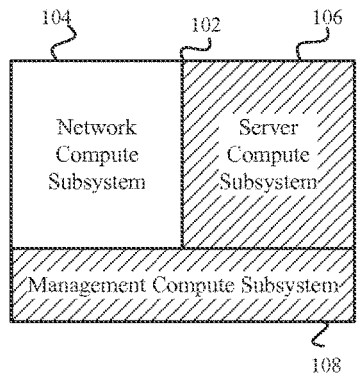
FIG. 3B
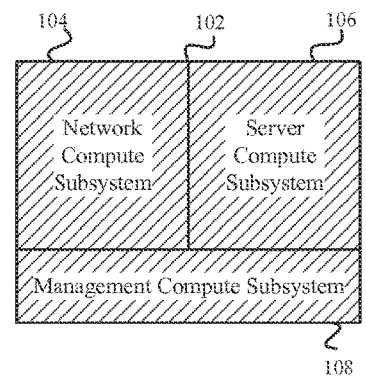
FIG. 3C
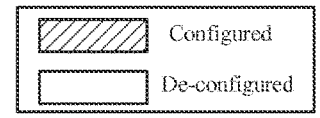

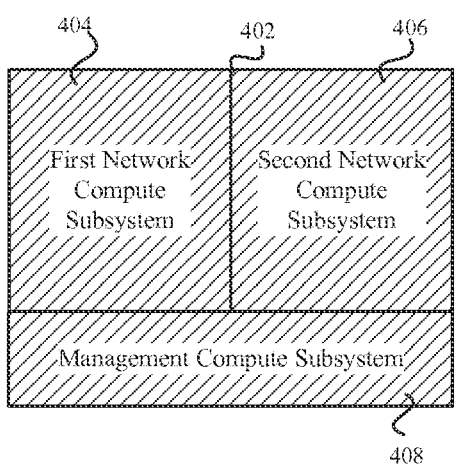 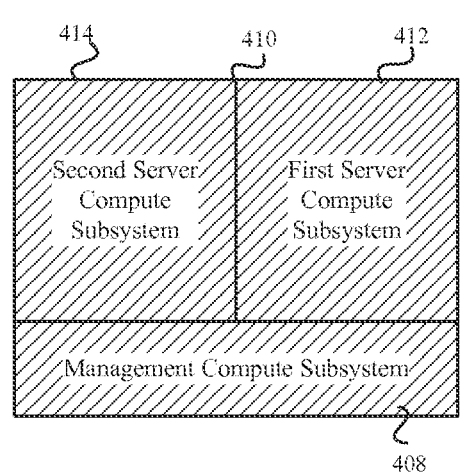
FIG. 4A               FIG. 4B
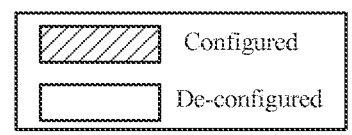

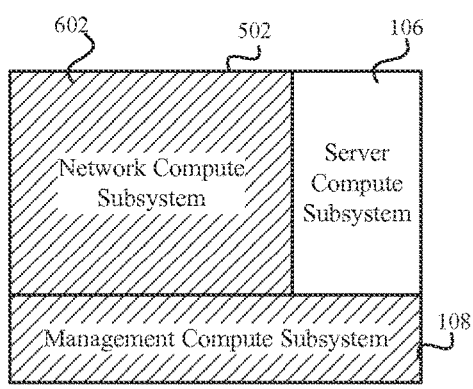
FIG. 6A
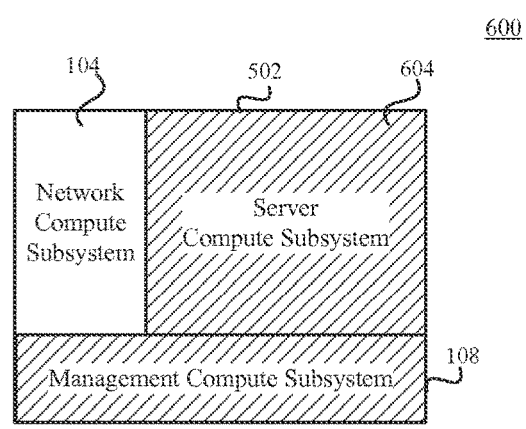
FIG. 6B
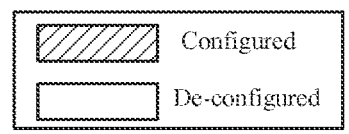

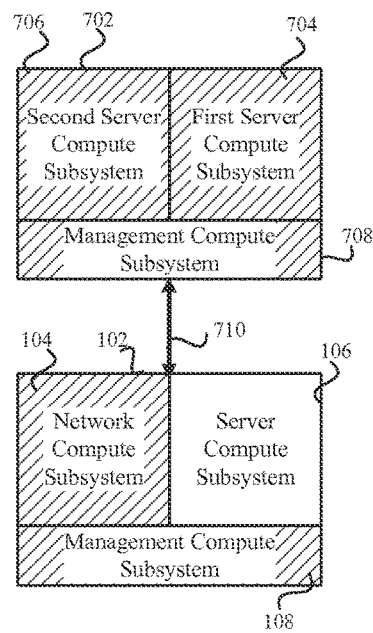 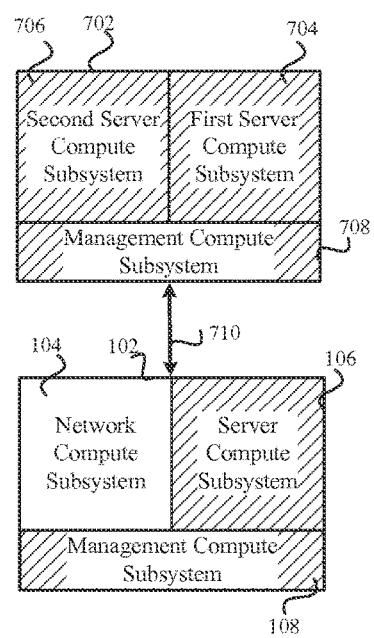 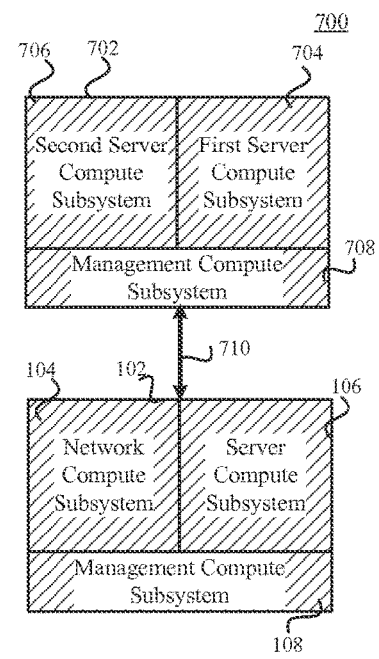
FIG. 7A  FIG. 7B  FIG. 7C
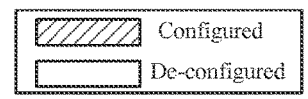

MULTI-MODE SYSTEM ON A CHIP

BACKGROUND

Many organizations and companies provide computing services over a plurality of communication networks. For example, computing services may include web services such as web storage or virtual servers that can be provided over the Internet to different clients.

Generally speaking, a system may include one or more subsystems to perform several different functions. However, once a system is fabricated, each subsystem may be limited to performing certain functionality. In some instances, additional functionalities may be provided at the expense of more silicon. Therefore, in most instances, clients may be limited to using specific functionality provided by each subsystem based on the pre-determined configuration for that subsystem.

BRIEF DESCRIPTION OF THE DRAWINGS

Various embodiments in accordance with the present disclosure will be described with reference to the drawings, in which:

FIG. 3A illustrates a SoC configuration in a first mode according to one embodiment of the disclosed technology.

FIG. 3B illustrates a SoC configuration in a second mode according to one embodiment of the disclosed technology.

FIG. 3C illustrates a SoC configuration in a third mode according to one embodiment of the disclosed technology.

FIG. 4A illustrates a SoC configuration in the first mode with a server compute subsystem repurposed as a network compute subsystem, according to one embodiment of the disclosed technology.

FIG. 4B illustrates a SoC configuration in the second mode with the network compute subsystem repurposed as the server compute subsystem, according to one embodiment of the disclosed technology.

FIG. 6A illustrates a SoC configured to operate in the first mode including the flexible resources, according to some embodiments of the disclosed technology.

FIG. 6B illustrates the SoC configured to operate in the second mode according to some embodiments of the disclosed technology.

FIG. 7A illustrates a first SoC that is configured to operate in the second mode to communicate with a second SoC that is configured to operate in the first mode, according to one embodiment of the technology.

FIG. 7B illustrates a first SoC that is configured to operate in the second mode to communicate with a second SoC that is configured to operate in the second mode, according to one embodiment of the technology.

FIG. 7C illustrates a first SoC that is configured to operate in the second mode to communicate with a second SoC that is configured to operate in the third mode, according to one embodiment of the technology.

DETAILED DESCRIPTION

Figure 1:
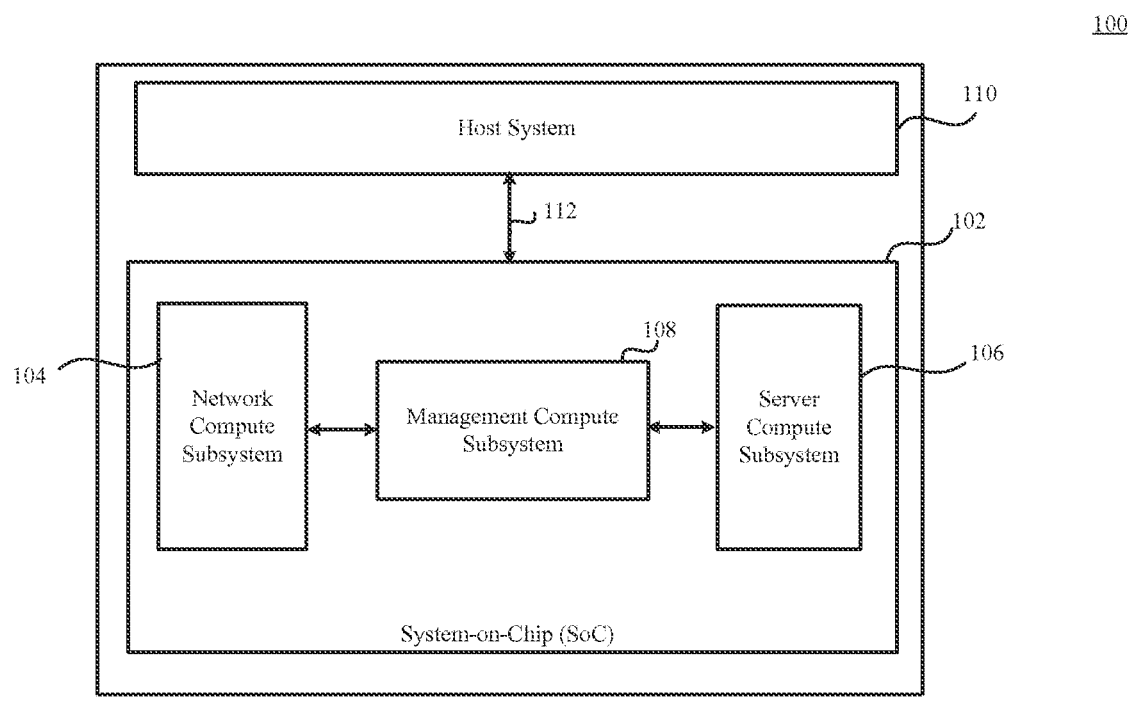
FIG. 1 illustrates a block diagram of a system according to some embodiments of the disclosed technology.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Generally, a computing system may include one or more compute subsystems to perform several different functions. In most instances, once the computing system is fabricated, each compute subsystem may be limited to performing certain functionality. In some instances, additional functionalities may be provided at the expense of more silicon. For example, the computing system may require additional chips to provide additional functionalities. Therefore, in most instances, clients may be limited to using specific functionality provided by each subsystem based on the pre-determined configuration for that subsystem.

Embodiments of the technology can provide various configurations and modes for operating a System on a Chip (SoC). For example, the SoC may be communicatively coupled to a host system (e.g., an x86 server) to provide various services such as network traffic monitoring, network traffic shaping, computing, etc. According to certain embodiments, the SoC may include a network compute subsystem for at least managing network traffic for the host system and a server compute subsystem for providing compute services. In some embodiments of the disclosed technology, the SoC may be operated in a first mode to provide networking services only (e.g., when the server compute subsystem is de-configured or inactive), in a second mode to provide compute services only (e.g., when the network compute subsystem is de-configured or inactive) or in a third mode to provide both networking and compute services concurrently (e.g., when both the network compute subsystem and the server compute subsystem are active or functional).

Computer networks may typically include a plurality of servers that can host data and provide services to multiple clients or organizations. For example, servers can provide services such as cloud computing, analytics, web services, storage, databases, applications, deployment services, etc. to a potentially larger number of client computers. The clients or organizations can use these services or data to power a wide variety of workloads such as storage, data processing and warehousing, web and mobile applications, archive and many other tasks. Generally, clients request services or data from the servers and the servers respond by executing certain tasks to service the request and/or provide the data over the network. The network traffic may vary depending upon a number of factors such as number of clients requesting services at a certain time, capacity of the servers, etc.

In some instances, a network system can monitor network traffic to regulate the traffic and to minimize bandwidth congestion. For example, the network system may be communicatively coupled to a host system (e.g., an x86 server) that provides web services to different clients. The network system may include one or more processor cores, caches, network acceleration logic, memory controllers and an I/O subsystem, etc. In some embodiments, the network system may also perform other functions such as traffic shaping, network storage processing, etc. associated with the web services offered by the server (e.g., host system). In some instances, the functionality of the network system may be implemented as a compute subsystem on a System-on-Chip (SoC) that may be communicatively coupled to the host system. For example, the SoC can be coupled to the host system (e.g., one or more servers) using a plug-in card or can be soldered to the motherboard of the host system.

In some embodiments, the SoC may also include a server compute subsystem and a management compute subsystem in addition to the network compute subsystem. For example, the server compute subsystem may be configured to provide compute services and the management compute subsystem may be configured to manage the resources for the network compute subsystem and the server compute subsystem. In some instances, the network compute subsystem and the server compute subsystem may include dedicated resources. For example, the resources may include processor cores, Level 1 (L1) caches, Level 2 (L2) caches, Level 3 (L3) or last level caches, memory controllers, memory channels, I/O controllers, various I/O interfaces, etc.

In most instances, once a SoC is fabricated, the SoC may be limited to providing only certain kinds of services based on a particular configuration. For example, the SoC may be fabricated in a first configuration to provide a set of functionalities or in a second configuration to provide another set of functionalities. In addition, once a SoC is fabricated with a certain configuration, the number and types of processing and memory resources may be fixed for each compute subsystem. Hence, each SoC may be limited to providing a type and level of service based on a pre-determined configuration.

Embodiments of the disclosed technology can provide various configurations and modes for operating a System on a Chip (SoC). The SoC may be communicatively coupled to a host system (e.g., an x86 server) to provide various services such as traffic monitoring, traffic shaping, computing, etc. In some embodiments of the technology, the SoC may include multiple subsystems such as a server compute subsystem to provide compute services, a network compute subsystem to at least manage network traffic, and a management compute subsystem to manage the network compute subsystem and the server compute subsystem.

In embodiments of the disclosed technology, the SoC can be configured to operate in one of the plurality of modes. For example, in different embodiments, the SoC may be operated in a first mode to provide networking services only, in a second mode to provide compute services only or in a third mode to provide both networking and compute services concurrently. In addition, each mode can be implemented using different technique. For example, in one embodiment, each compute subsystem can have fixed allocation of resources. In another embodiment, resources associated with the de-configured or inactive compute subsystem can be reassigned to the active compute subsystem. In another embodiment, the SoC can include reconfigurable resources that can be steered to the active compute subsystem. In some embodiments, the management compute subsystem may determine a configuration for the SoC at power-up based on hardware configuration (e.g., one or more pins, jumper wires or fuses), software configuration (e.g., data field of a software register) or a policy. For example, the policy may be provided by an external entity or an operator via a network connection.

In one embodiment, the management compute subsystem may configure the SoC to operate in the first mode, e.g., the SoC may only provide network related services. For example, the server compute subsystem may be powered down or de-configured. In one embodiment, the SoC can be configured to operate as the network compute subsystem on a Peripheral Component Interconnect Express (PCIe) device in the host system. In some embodiments, the management compute subsystem can further configure the SoC in the first mode to disable the server compute subsystem and reconfigure processing and memory resources associated with the server compute subsystem to operate as resources for the network compute subsystem. In another embodiment, the management compute subsystem can further configure the SoC in the first mode to repurpose the server compute subsystem as a second network compute subsystem. For example, the network compute subsystem may be used as a first network compute subsystem and the server compute subsystem may be used as a second network compute subsystem. In some embodiments, at least a portion of the reconfigurable resources can be steered to the network compute subsystem in the first mode. Thus, some embodiments of the disclosed technology can enable the SoC to provide high performance networking services in the first mode, e.g., using the resources associated with the server compute subsystem or the reconfigurable resources.

In one embodiment, the management compute subsystem can configure the SoC to operate in the second mode, e.g., the SoC may only provide compute related services. For example, the network compute subsystem may be powered down or de-configured. In one embodiment, the SoC can be configured to operate as the server compute subsystem on a Peripheral Component Interconnect Express (PCIe) device in the host system. In some embodiments, the management compute subsystem 108 may further configure the SoC in the second mode to disable the network compute subsystem and reconfigure processing and memory resources associated with the network compute subsystem to operate as resources for the server compute subsystem. In another embodiment, the management compute subsystem may further configure the SoC in the second mode to repurpose the network compute subsystem as a second server compute subsystem. For example, the server compute subsystem may be used as a first server compute subsystem and the network compute subsystem may be used as a second server compute subsystem. In some embodiments, at least a portion of the reconfigurable resources can be steered to the server compute subsystem in the second mode. Thus, some embodiments of the disclosed technology can enable the SoC to provide high performance computing services in the second mode, e.g., using the resources associated with the network compute subsystem or the reconfigurable resources.

In one embodiment, the management compute subsystem can configure the SoC to operate in the third mode, e.g., both network compute subsystem and the server compute subsystem may be enabled and the SoC may provide the network related services and compute related services concurrently. In the third mode, each of the network compute subsystem and the server compute subsystem may utilize its dedicated processing and memory resources. In some embodiments, in the third mode, the server compute subsystem may be configured as a host system and the network compute subsystem may be configured to manage network traffic for the server compute subsystem configured as the host system.

In some embodiments of the disclosed technology, a system can include a plurality of SoCs, wherein a first SoC in the plurality of SoCs can be configured to operate in one of the plurality of modes and a second SoC in the plurality of SoCs can be configured to operate in one of the plurality of modes. In one embodiment, the plurality of SoCs in the system can communicate with each other using a standard interface such as Peripheral Component Interconnect Express (PCIe) interface. For example, in one embodiment, a first SoC that is configured to operate in the second mode to provide compute services only can operate as a general purpose processor in a host system and can communicate with one or more other SoCs that are configured in one of the plurality of modes. In another embodiment, a first SoC that is configured to operate in the first mode to provide network services only can operate as a network processor for one or more servers (e.g., SoCs that are configured in the second mode or third party SoCs).

A typical SoC may include functionalities of a system integrated into a single chip. For example, a SoC can include multiple processor cores, volatile and non-volatile memory modules, memory controllers, one or more internal buses, standard interfaces, peripherals, voltage regulators, power management circuits, timing resources such as oscillators and phase locked loop, etc. Implementing the functionalities of multiple chips on a single chip can reduce manufacturing and assembly costs. In addition, the SoCs generally have smaller footprints and space requirements. Therefore, SoC implementations generally consume less power and are more cost effective as compared to a multi-chip system implementing the same functionality.

Although, embodiments of the disclosed technology are described and shown as configuring the SoC to operate in one of the three modes, aspects of the disclosed technology are not limited to configuring the SoC to operate in one of the three modes. For example, in some implementations, multiple compute subsystems may be included in a SoC and the SoC can be configured to operate as one of the compute subsystems or to operate as more than two compute subsystems concurrently without deviating from the scope of the disclosed technology.

FIG. 1 illustrates an exemplary system 100 according to certain embodiments of technology described herein. In certain embodiments, a system-on-chip (SoC) 102 may be configured to operate in one of the plurality of modes.

The SoC 102 may include a network compute subsystem 104, a server compute subsystem 106 and a management compute subsystem 108. The SoC 102 may be configured to communicate with a host system 110. The communication between the SoC 102 and the host system 110 may be performed using an interface 112 such as a Peripheral Component Interconnect Express (PCIe) interface or any other suitable interface.

In some instances, the host system 110 may provide a multi-tenant platform to multiple clients. For example, the host system 110 may provide services such as cloud computing, cloud storage, analytics, web services, databases, applications, deployment services, etc. to different clients. The host system 110 may include a server, for example, an x86 server. In some embodiments, one or more processors in the host system 110 may be connected to the sockets on the SoC 102. In some implementations, the SoC 102 can be coupled to the host system 110 using a plug-in card or soldered on the motherboard of the host system 110.

The network compute subsystem 104 may be configured to provide network related functionalities such as network traffic shaping, network acceleration, network storage processing, etc. In some embodiments, the network compute subsystem 104 may include at least some functionalities of a network interface controller (NIC) or a network coprocessor. In certain embodiments, the network compute subsystem 104 may include some functionalities related to web services offered by the host system 110, for example, billing, rate, traffic shaping, encryption, choking, etc. The network compute subsystem 104 may include processing and memory resources such as processing cores, caches, memory controllers, I/O controllers, etc.

The server compute subsystem 106 may be configured to provide compute services, e.g., virtual or physical resources to client computers. For example, the compute services may include launching virtual machine instances of various sizes, associating storage volumes to the virtual machines on demand, providing client computers with resources to run applications by renting virtual machines, data processing, storage, etc. The server compute subsystem 106 may include processing and memory resources such as processing cores, caches, memory controllers, I/O controllers, etc.

In some embodiments, the server compute subsystem 106 may be used to offload some of the work load of the host system 110. In some instances, the host system 110 together with the server compute subsystem 106 may provide high performance compute services. For example, the host system 110 may focus on processing quick turnaround services and may offload any low performance work-loads to the server compute subsystem 106 thus increasing the throughput of the system.

In embodiments of the disclosed technology, the SoC 102 can be configured to operate in one of the plurality of modes. For example, in a first mode, the SoC 102 can be configured to operate the network compute subsystem 104 for at least managing network traffic. For example, in some embodiments, the SoC 102 may be configured to operate the network compute subsystem 104 on a PCIe device in the host system 110 (e.g., via the interface 112), e.g., to manage network traffic for the host system 110. In a second mode, the SoC 102 can be configured to operate the server compute subsystem 106 for providing compute services. For example, in some embodiments, the SoC 102 may be configured to operate the server compute subsystem 106 on a PCIe device in the host system 110 (e.g., via the interface 112). In a third mode, the SoC 102 can be configured to operate the network compute subsystem 104 and the server compute subsystem 106 concurrently. In some embodiments, the server compute subsystem 106 may be configured as a host system and the network compute subsystem 104 may manage network traffic for the server compute subsystem 106 configured as the host system. In some embodiments, the SoC 102 can be configured in one of the plurality of modes by the management compute subsystem 108.

In some embodiments, when the SoC 102 is operated in the first mode, the server compute subsystem 106 may be de-configured or inactive. For example, in some instances, the server compute subsystem 106 may be powered off. In some other embodiments, when the SoC 102 is operated in the first mode, the server compute subsystem 106 may be repurposed as a second network compute subsystem. For example, in some instances, the SoC 102 may be configured to provide high performance networking services by utilizing two network compute subsystems. In some embodiments, in the first mode, the SoC 102 may be configured to disable the server compute subsystem 106 and reconfigure the processing and memory resources associated with the server compute subsystem 106 to operate as resources for the network compute subsystem 104 to provide high performance networking services. In some embodiments, in the first mode, the SoC 102 can be configured to operate as a network processor for one or more servers.

In some embodiments, when the SoC 102 is operated in the second mode, the network compute subsystem 104 may be de-configured or inactive. For example, in some instances, the network compute subsystem 104 may be powered off. In one embodiment, in the second mode the SoC 102 can be configured to operate as a general purpose processor in the host system 110. For example, in some embodiments, a general purpose processor may be able to run on any platform, e.g., any operating system. In some embodiments, a general purpose processor may be capable of performing most of the functionalities of a computer's central processing unit such as general purpose computations and may be capable of supporting a number of networking and messaging protocols. In some other embodiments, when the SoC 102 is operated in the second mode, the network compute subsystem 104 may be repurposed as a second server compute subsystem. For example, in some instances, the SoC 102 may be configured to provide high performance compute services by utilizing two server compute subsystems. In some embodiments, in the second mode, the SoC 102 may be configured to disable the network compute subsystem 104 and reconfigure the processing and memory resources associated with the network compute subsystem 104 to operate as resources for the server compute subsystem 106 to provide high performance compute services.

In some embodiments, the management compute subsystem 108 may be configured to configure the SoC 102 to operate in one of the plurality of modes, e.g., the first mode, the second mode or the third mode. The management compute subsystem 108 may also be configured to manage various subsystems of the SoC 102. For example, the management compute subsystem 108 may be configured to provide boot management, resetting and power management of different subsystems and any other SOC management related functionality. For example, in some embodiments, the management compute subsystem 108 may be configured to power down each compute subsystem without affecting other compute subsystems, e.g., network compute subsystem 104 and the server compute subsystem 106 may be powered up or down independently. The management compute subsystem 108 may also be configured to manage the resources associated with different subsystems. In some embodiments, the management compute subsystem 108 may include its own processing resources such as one or more processor cores.

Hence, embodiments of the disclosed technology can allow the SoC 102 to operate in one of the plurality of modes by providing different functionalities using the same silicon. For example, the same SoC 102 can be operated as a network compute subsystem, as a server compute subsystem or as a network compute subsystem and the server compute subsystem concurrently in different configurations with minimal cost and without the need of any additional silicon.

Figure 2:
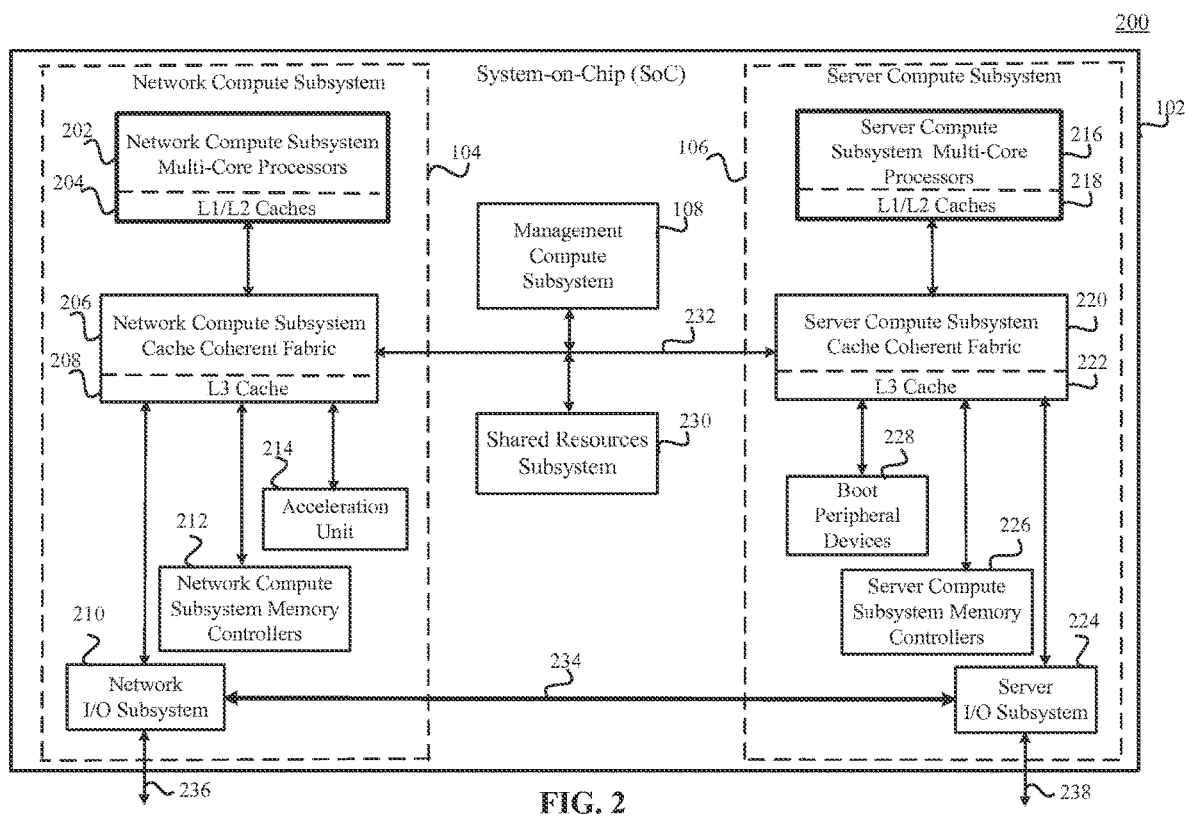
FIG. 2 illustrates a detailed block diagram of a system-on-chip (SoC) according to certain embodiments of the technology.

FIG. 2 illustrates a detailed block diagram of the SoC 102 according to some embodiments of the disclosed technology.

The SoC 102 may include the network compute subsystem 104, server compute subsystem 106, management compute subsystem 108 and a shared resources subsystem 230. The management compute subsystem 108 may communicate with other subsystems such as the network compute subsystem 104, server compute subsystem 106 and the shared resources subsystem 230 using an internal bus 232.

The network compute subsystem 104 may include network compute subsystem multi-core processors 202, L1/L2 caches 204, a network compute subsystem cache coherent fabric 206, an L3 cache 208, a network I/O subsystem 210, network compute subsystem memory controllers 212 and an acceleration unit 214. In some embodiments, allocation of the processing and memory resources for the network compute subsystem 104 may be fixed. For example, the number of multi-core processors in the network compute subsystem multi-core processors 202, the number of memory controllers in the network compute subsystem memory controllers 212 and size of the L1/L2 caches 204, L3 cache 208 may be fixed after power on reset.

The server compute subsystem 106 may include server compute subsystem multi-core processors 216, L1/L2 caches 218, a server compute subsystem cache coherent fabric 220, an L3 cache 222, a server I/O subsystem 224, server compute subsystem memory controllers 226 and boot peripheral devices 228. In some embodiments, allocation of the processing and memory resources for the server compute subsystem 106 may be fixed. For example, the number of multi-core processors in the server compute subsystem multi-core processors 216, the number of memory controllers in the server compute subsystem memory controllers 226 and size of the L1/L2 caches 218, L3 cache 222 may be fixed after power on reset.

The network compute subsystem multi-core processors 202 may include a plurality of multiple processor cores or processing units within the same processor. For example, in one instance, the network compute subsystem multi-core processors 202 may include twelve, 2-core processors. The network compute subsystem multi-core processors 202 may be configured to execute a plurality of instructions collectively on one or more processors of the processor cores. The instructions may be stored on a computer-readable storage medium, for example, in the form of a computer program. The computer-readable storage medium may be non-transitory. In some embodiments, the multi-core processors may share certain resources, such as busses and Level 1 (L1) caches and/or Level 2 (L2) caches between multiple-cores. For example, in some instances, each core in a single or multi-core processor may also include multiple executing logical processors (or threads). In such a core (that supports multiple logical processors), several stages of the execution pipeline and also lower level caches (e.g., L1 or L2) may also be shared. Some of the non-limiting examples of the multi-core processors may include ARM's cortex A57, MIPS, AMD Phenom, Intel ATOM, etc.

In some embodiments, the L1/L2 caches 204 may be shared between multiple cores of the network compute subsystem multi-core processors 202. For example, L1 cache may be used as a primary cache and L2 cache may be used as a secondary cache. In some embodiments, the L1/L2 caches 204 may be built into the network compute subsystem multi-core processors 202. For example, one L1/L2 cache may be integrated with one multi-core processor. In some embodiments, the network compute subsystem multi-core processors 202 and the L1/L2 caches 204 may be reconfigured to operate as computing resources for the server compute subsystem 106. For example, when the SoC 102 is configured to operate in the second mode, the network compute subsystem 104 may be de-configured to disable the network related functionalities provided by the SoC 102.

The network I/O subsystem 210 may include one or more interfaces to communicate with various internal and external components. For example, the network I/O subsystem 210 may include an interface 236 to communicate with the host system 110. The network I/O subsystem 210 may include an internal interface to communicate with the server compute subsystem 106, e.g., interface 234. In some embodiments, when the server compute subsystem 106 is disabled, the interface 234 to communicate with the server compute subsystem 106 may not be utilized. In some embodiments, the server compute subsystem 106 may communicate with the host system 110 and the network via the network I/O subsystem 210, for example, via the interface 234. In some embodiments, the interfaces to communicate with the host system 110 and the server compute subsystem 106 may be based on a standard interface such as PCIe. The network I/O subsystem 210 may also include an interface to communicate with the network (e.g., the Internet, the Intranet), etc. For example, the interface may be based on a standard such as Ethernet, token ring, Wi-Fi, ATM (Asynchronous Transfer Mode), etc. In some embodiments, the network I/O subsystem 210 may also include peripheral devices such as one or more SATA controllers, Ethernet MACs, PCIe devices, SERDES (Serialize-De-serialize) I/O multiplexers, UARTs (Universal Asynchronous Receivers/Transmitters), I2C (Inter-Integrated Circuit), GPIOs (General Purpose Input/Output) and any other suitable I/O device for SoC functionality. In some embodiments, the network I/O subsystem 210 may also include an interface (e.g., SATA) to connect to external mass storage devices such as hard drives, optical drives, etc.

The network compute subsystem memory controllers 212 may include a plurality of memory controllers such as DDR (Double Data Rate) controllers, DDR2 controllers or any suitable memory controller. The network compute subsystem memory controllers 212 may be used to manage the access to an external memory (e.g., system memory). For example, the external system memory may include DDR synchronous dynamic random-access memory (DRAM), DDR2 DRAM, DRAM, etc. In some embodiments, the number of memory controllers in the network compute subsystem memory controllers 212 may be based on the number of processor cores, size of caches, etc.

The acceleration unit 214 may include one or more accelerators such as network accelerators. In some embodiments, the acceleration unit 214 may include a combination of various hardware and software techniques to provide bandwidth optimization or network acceleration, for example, using hardware accelerators, various pipelines, caching, compression, etc. The acceleration unit 214 may also support RDMA (Remote Direct Memory Access), crypto engines, etc. For example, in some instances, the crypto engines may execute cryptographic functions in hardware, thus reducing software overhead and accelerating the execution of decryption, encryption and authentication functions related to networking.

The L3 cache 208 may include last level caches. In some embodiments, the L3 cache 208 may be shared by multiple cores of the network compute subsystem multi-core processors 202. In this specification, terms last level caches and L3 caches may be used interchangeably, however, in some systems the last level cache may be a Level 2 cache or a Level 4 cache or any other level without deviating from the scope of the technology. In some embodiments, the L3 cache 208 and the network compute subsystem memory controllers 212 may be reconfigured to operate as computing resources for the server compute subsystem 106. For example, when the SoC 102 is configured to operate in the second mode, the network compute subsystem 104 may be de-configured to disable the network related functionalities provided by the SoC 102.

The network compute subsystem cache coherent fabric 206 may represent a physical layer fabric that can connect to all the resources allocated to the network compute subsystem 104. In some embodiments of the disclosed technologies, the network compute subsystem cache coherent fabric 206 may provide hardware security and performance/jitter isolation by allowing dedicated hardware paths for all the resources allocated to the network compute subsystem 104. In some embodiments, the network compute subsystem cache coherent fabric 206 may be configured to maintain coherency among different components of the network compute subsystem 104, for example, the network compute subsystem multi-core processors 202, L1/L2 caches 204, L3 cache 208, network I/O subsystem 210, network compute subsystem memory controllers 212, acceleration unit 214 and the shared resources subsystem 230. In some instances, the network compute subsystem cache coherent fabric 206 may represent the communication backbone of network compute subsystem 104. In some embodiments, the network compute subsystem cache coherent fabric 206 may be configured to ensure that all shared data is coherent in the network compute subsystem 104. For example, if certain shared data is stored in two or more locations (e.g., multiple processors, multiple cores of a processor, caches, etc.), the network compute subsystem cache coherent fabric 206 may be operable to maintain consistency of the shared data in different locations. In some embodiments, the network compute subsystem cache coherent fabric 206 may include a coherency controller and a coherency directory to maintain the coherency among different components of the network compute subsystem 104.

The server compute subsystem multi-core processors 216 may include a plurality of multiple processor cores or processing units within the same processor. For example, in one instance, the server compute subsystem multi-core processors 216 may include twelve, 2-core processors. The server compute subsystem multi-core processors 216 may be configured to execute a plurality of instructions collectively on one or more processors of the processor cores. The instructions may be stored on a computer-readable storage medium, for example, in the form of a computer program. The computer-readable storage medium may be non-transitory.

In some embodiments, the L1/L2 caches 218 may be shared between multiple cores of the server compute subsystem multi-core processors 216. For example, L1 cache may be used as a primary cache and L2 cache may be used as a secondary cache. In some embodiments, the L1/L2 caches 218 may be built into the server compute subsystem multi-core processors 216. In some embodiments, the server compute subsystem multi-core processors 216 and the L1/L2 caches 218 may be reconfigured to operate as computing resources for the network compute subsystem 104. For example, when the SoC 102 is configured to operate in the first mode, the server compute subsystem 106 may be de-configured to disable the compute related functionalities provided by the SoC 102.

The server compute subsystem memory controllers 226 may include a plurality of memory controllers such as DDR controllers, DDR2 controllers or any suitable memory controller. The server compute subsystem memory controllers 226 may be used to manage the access to the external memory. In some embodiments, the number of memory controllers in the server compute subsystem memory controllers 226 may be based on the number of processor cores, size of caches, etc.

The server I/O subsystem 224 may include one or more interfaces to communicate with various internal and external components. For example, the server I/O subsystem 224 may include an interface 238 to communicate with the host system 110. The server I/O subsystem 224 may include an internal interface to communicate with the network compute subsystem 104, e.g., interface 234. In some embodiments, when the network compute subsystem 104 is disabled, the interface 234 to communicate with the network compute subsystem 104 may not be utilized. In some embodiments, the server compute subsystem 106 may communicate with the host system 110 and the network via the network I/O subsystem 210, for example, via the interface 234. In some embodiments, the interfaces to communicate with the host system 110 and the network compute subsystem 104 may be based on a standard interface such as PCIe. The server I/O subsystem 224 may also include an interface to communicate with the network (e.g., the Internet, the Intranet), etc. For example, the interface may be based on a standard such as Ethernet, token ring, Wi-Fi, ATM (Asynchronous Transfer Mode), etc. In some embodiments, the server I/O subsystem 224 may also include peripheral devices such as one or more SATA controllers, Ethernet MACs, PCIe devices, SERDES (Serialize-De-serialize) I/O multiplexers, UARTs, I2C, GPIOs and any other suitable I/O device for SoC functionality. In some embodiments, the server I/O subsystem 224 may also include an interface (e.g., SATA) to connect to external mass storage devices such as hard drives, optical drives, etc.

The L3 cache 222 may include last level caches. In some embodiments, the L3 cache 222 may be shared by multiple cores of the server compute subsystem multi-core processors 216. In some embodiments, the L3 cache 222 and the server compute subsystem memory controllers 226 may be reconfigured to operate as memory resources for the network compute subsystem 104. For example, when the SoC 102 is configured to operate in the first mode, the server compute subsystem 106 may be de-configured to disable the compute related functionalities provided by the SoC 102.

The boot peripheral devices 228 may include one or more peripherals for the server compute subsystem 106. For example, the boot peripheral devices 228 may include a boot ROM, EEPROM or a flash memory. In some embodiments, one of the boot peripheral devices 228 may include the BIOS software to bootstrap an operating system for the server compute subsystem 106.

The server compute subsystem cache coherent fabric 220 may represent a physical layer fabric that can connect to all the resources allocated to the server compute subsystem 106. In embodiments of the disclosed technologies, the server compute subsystem cache coherent fabric 220 may provide hardware security and performance/jitter isolation by allowing dedicated hardware paths for all the resources allocated to the server compute subsystem 106. In some embodiments, the server compute subsystem cache coherent fabric 220 may be configured to maintain coherency among different components of the server compute subsystem 106, for example, the server compute subsystem multi-core processors 216, L1/L2 caches 218, server compute subsystem memory controllers 226, L3 cache 222, server I/O subsystem 224 and the shared resources subsystem 230. In some instances, the server compute subsystem cache coherent fabric 220 may represent the communication backbone of server compute subsystem 106. In some embodiments, the server compute subsystem cache coherent fabric 220 may be configured to ensure that all shared data is coherent in the server compute subsystem 106. For example, if certain shared data is stored in two or more locations (e.g., multiple processors, multiple cores of a processor, caches, etc.), the server compute subsystem cache coherent fabric 220 may be operable to maintain consistency of the shared data in different locations. In some embodiments, the server compute subsystem cache coherent fabric 220 may include a coherency controller and a coherency directory to maintain the coherency among different components of the server compute subsystem 106.

The shared resources subsystem 230 may include one or more resources that can be shared between the network compute subsystem 104 and the server compute subsystem 106. In some embodiments, the shared resources subsystem 230 may include one or more peripherals that can be safely shared between the network compute subsystem 104 and the server compute subsystem 106 without causing any jitter or safety concerns. For example, the shared resources subsystem 230 may include a random number generator, a communication mailbox, scratchpad memory, flash memory, etc.

The management compute subsystem 108 may be configured to configure the SoC 102 to operate in one of the plurality of modes. In some embodiments, the management compute subsystem 108 may determine a configuration for the SoC 102 at power-up based on hardware configuration (e.g., one or more pins, jumper wires or fuses), software configuration (e.g., data field of a software register) or a policy. For example, the policy may be provided by an external entity or an operator via a network connection. In some embodiments, the management compute subsystem 108 may determine a configuration of the SoC 102 dynamically at run-time.

In one embodiment, the management compute subsystem 108 may configure the SoC 102 to operate in the first mode, e.g., the SoC 102 may only provide network related services. For example, the server compute subsystem 106 may be powered down or de-configured. In some embodiments, the management compute subsystem 108 may further configure the SoC 102 in the first mode to disable the server compute subsystem 106 and reconfigure processing and memory resources associated with the server compute subsystem 106 to operate as resources for the network compute subsystem 104. In one embodiment, the management compute subsystem 108 may reconfigure the server compute subsystem multi-core processors 216, L1/L2 caches 218, L3 cache 222, server compute subsystem memory controllers 226 and the server I/O subsystem 224 to operate as resources for the network compute subsystem 104. In another embodiment, the management compute subsystem 108 may further configure the SoC 102 in the first mode to repurpose the server compute subsystem 106 as a second network compute subsystem. For example, the network compute subsystem 104 may be used as a first network compute subsystem and the server compute subsystem 106 may be used as a second network compute subsystem. Thus, some embodiments of the disclosed technology can enable the SoC 102 to provide high performance networking services in the first mode.

In one embodiment, the management compute subsystem 108 may configure the SoC 102 to operate in the second mode, e.g., the SoC 102 may only provide compute related services. For example, the network compute subsystem 104 may be powered down or de-configured. In some embodiments, the management compute subsystem 108 may further configure the SoC 102 in the second mode to disable the network compute subsystem 104 and reconfigure processing and memory resources associated with the network compute subsystem 104 to operate as resources for the server compute subsystem 106. In one embodiment, the management compute subsystem 108 may reconfigure the network compute subsystem multi-core processors 202, L1/L2 caches 204, L3 cache 208, network compute subsystem memory controllers 212 and the network I/O subsystem 210 to operate as resources for the server compute subsystem 106. In another embodiment, the management compute subsystem 108 may further configure the SoC 102 in the second mode to repurpose the network compute subsystem 104 as a second server compute subsystem 106. For example, the server compute subsystem 106 may be used as a first server compute subsystem and the network compute subsystem 104 may be used as a second server compute subsystem. Thus, some embodiments of the disclosed technology can enable the SoC 102 to provide high performance computing services in the second mode.

In one embodiment, the management compute subsystem 108 may configure the SoC 102 to operate in the third mode, e.g., both network compute subsystem 104 and the server compute subsystem 106 may be enabled and the SoC 102 may provide the network related services and compute related services concurrently. In the third mode, each of the network compute subsystem 104 and the server compute subsystem 106 may utilize its dedicated processing and memory resources.

FIG. 3A illustrates a SoC configuration in the first mode according to an embodiment of the disclosed technology.

In the first mode, the SoC 102 can be operated as a network compute subsystem for at least managing network traffic for the host system 110. In one embodiment, the SoC 102 may be configured to operate the network compute subsystem 104 on a PCIe device in the host system 110, e.g., using the interface 236. For example, in some instances, the SoC may be used to provide only network related functionalities such as network traffic shaping, network acceleration, network storage processing, etc. and may not be used to provide compute related services. In some embodiments, as illustrated in FIG. 3A, in the first mode, only the network compute subsystem 104 may be active or configured to at least manage network traffic for the host system 110. The server compute subsystem 106 may be inactive or de-configured. In some embodiments, at least a portion of the server compute subsystem 106 may be powered off. The management compute subsystem 108 may be active and configured to manage the resources for the network compute subsystem 104 and the server compute subsystem 106. For example, in some embodiments, the management compute subsystem 108 may further configure the SoC 102 to reconfigure processing and memory resources associated with the server compute subsystem 106 to operate as resources for the network compute subsystem 104. Referring back to FIG. 2, the management compute subsystem 108 may reconfigure the server compute subsystem multi-core processors 216, L1/L2 caches 218, L3 cache 222, server compute subsystem memory controllers 226 and the server I/O subsystem 224 to operate as resources for the network compute subsystem 104. Thus, some embodiments of the disclosed technology may enable the SoC 102 to provide high performance networking services by utilizing resources from both the compute subsystems.

FIG. 3B illustrates a SoC configuration in the second mode according to an embodiment of the disclosed technology.

In the second mode, the SoC 102 can be operated as a server compute subsystem for providing compute services. In one embodiment, the SoC 102 may be configured to operate the server compute subsystem 106 on a PCIe device in the host system 110, e.g., using the interface 238. For example, in some instances, the SoC 102 may be used to provide only server related functionalities such as computing, data processing or providing other virtual or physical resources and may not be used to provide network related services. In some embodiments, as illustrated in FIG. 3B, in the second mode, only the server compute subsystem 106 may be active or configured to provide compute services. The network compute subsystem 104 may be inactive or de-configured. In some embodiments, at least a portion of the network compute subsystem 104 may be powered off. The management compute subsystem 108 may be active and configured to manage the resources for the network compute subsystem 104 and the server compute subsystem 106. For example, in some embodiments, the management compute subsystem 108 may further configure the SoC 102 to reconfigure processing and memory resources associated with the network compute subsystem 104 to operate as resources for the server compute subsystem 106. Referring back to FIG. 2, the management compute subsystem 108 may reconfigure the network compute subsystem multi-core processors 202, L1/L2 caches 204, L3 cache 208, network compute subsystem memory controllers 212 and the network I/O subsystem 210 to operate as resources for the server compute subsystem 106. Thus, some embodiments of the disclosed technology may enable the SoC 102 to provide high performance compute services by utilizing resources from both the compute subsystems.

FIG. 3C illustrates a SoC configuration in the third mode according to one embodiment of the disclosed technology.

In the third mode, the SoC 102 can be operated as the network compute subsystem 104 and the server compute subsystem 106 concurrently. For example, both the network compute subsystem 104 and the server compute subsystem 106 can be active. In some embodiments, the network compute subsystem 104 may be used to provide network related services such as network traffic shaping, network acceleration, network storage processing, etc. and the server compute subsystem 106 may be used to provide compute services such as computing, data processing or providing other virtual or physical resources. In some embodiments, in the third mode, the SoC 102 may be further configured to operate the server compute subsystem 106 as a host system and to operate the network compute subsystem 104 to manage network traffic for the server compute subsystem 106. For example, in some embodiments, the SoC 102 may be used as a host system that can provide compute services and the network services. The management compute subsystem 108 may be active and configured to manage the resources for the network compute subsystem 104 and the server compute subsystem 106. Thus, some embodiments of the disclosed technology may enable the SoC 102 to provide network services and the compute services concurrently by utilizing both the compute subsystems.

FIG. 4A illustrates a SoC configuration in the first mode with the server compute subsystem repurposed as the network compute subsystem, according to one embodiment of the disclosed technology.

In some embodiments, in the first mode, a SoC 402 can be configured to repurpose a server compute subsystem as a second network compute subsystem 406. For example, referring back to FIG. 3A, the server compute subsystem 106 may be inactive or de-configured in the first mode. The SoC 402 can also include a first network compute subsystem 404 that can be similar to the network compute subsystem 104 and a management compute subsystem 408 that can be similar to the management compute subsystem 108, as discussed previously with reference to FIGS. 2 and 3A. In some embodiments, repurposing a server compute subsystem as a network compute subsystem may include utilizing one or more resources associated with the server compute subsystem to perform network related functionalities instead of compute server related functionalities. For example, referring back to FIG. 2, the server I/O subsystem 238 may be utilized for network traffic monitoring and the server compute subsystem multi-core processors 216, L1/L2 caches 218, L3 cache 222 and server compute subsystem memory controllers 226 may be utilized to perform network storage processing. In some embodiments, the SoC 402 can be operated as a network processor. Thus, some embodiments of the disclosed technology may allow efficient use of resources to provide high performance networking services.

FIG. 4B illustrates a SoC configuration in the second mode with the network compute subsystem repurposed as the server compute subsystem, according to an embodiment of the disclosed technology.

In some embodiments, in the second mode, a SoC 410 can be configured to repurpose the network compute subsystem 104 as a second server compute subsystem 414. For example, referring back to FIG. 3B, the network compute subsystem 104 may be inactive or de-configured in the second mode. The SoC 410 can also include the management compute subsystem 408 and a first server compute subsystem 412 that can be similar to the server compute subsystem 106, as discussed previously with reference to FIGS. 2 and 3B. In some embodiments, repurposing a network compute subsystem as the second server compute subsystem may include utilizing one or more resources associated with the network compute subsystem to perform compute server related functionalities instead of network related functionalities. For example, referring back to FIG. 2, the network I/O subsystem 210 may be utilized for communicating with the host system 110 and the network compute subsystem multi-core processors 202, L1/L2 caches 204, L3 cache 208 and the network compute subsystem memory controllers 212 may be utilized to perform data processing. In some embodiments, the SoC 410 can be operated as a general purpose processor. Thus, some embodiments of the disclosed technology may allow efficient use of resources to provide high performance compute services.

Figure 5:
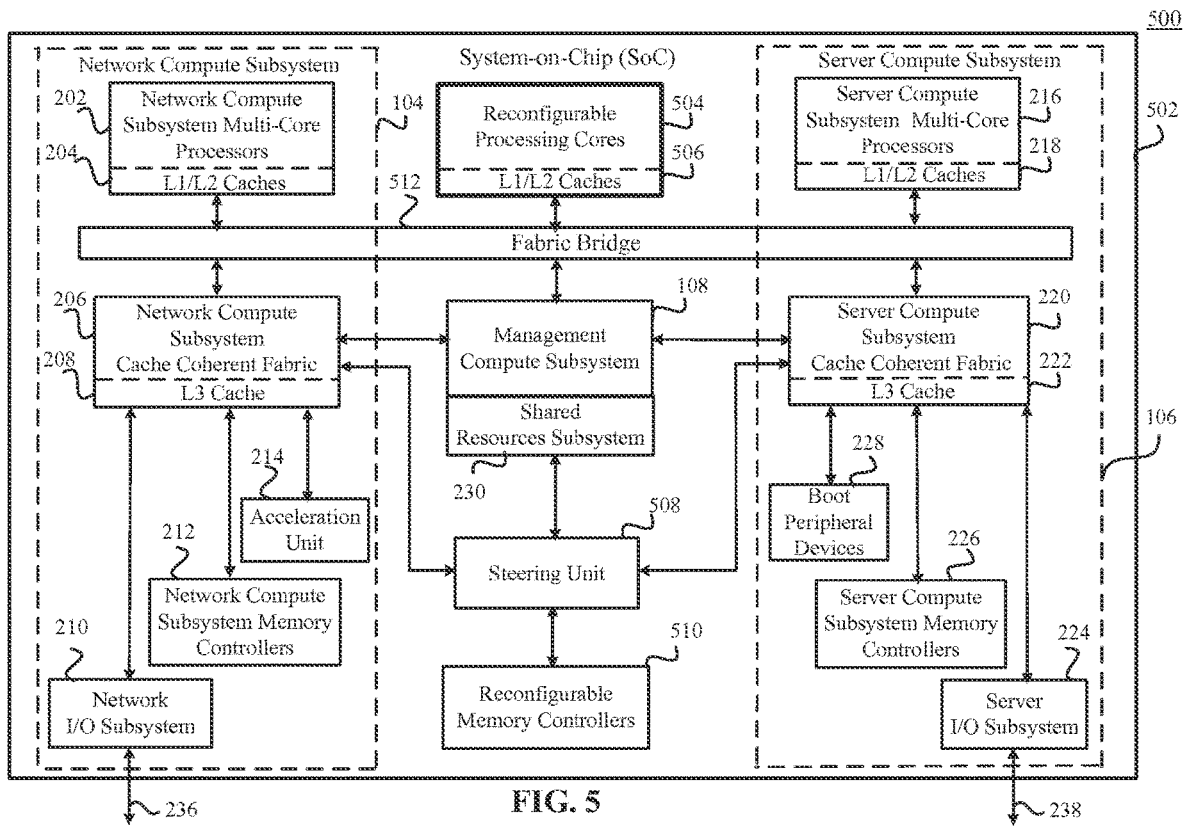
FIG. 5 illustrates a block diagram of a SoC with flexible pool of resources according to one embodiment of the disclosed technology.

FIG. 5 illustrates a block diagram of a SoC 502 with reconfigurable processing and memory resources according to one embodiment of the disclosed technology. Generally, the SoC 502 can include reconfigurable processing and memory resources that can be configured to function as part of a network compute subsystem or as part of a server compute subsystem based on the mode. The network compute subsystem and the server compute subsystem can each also include its own dedicated processing and memory resources.

The SoC 502 can be similar to the SoC 102 as discussed previously with reference to FIG. 2. In one embodiment, the SoC 502 may include reconfigurable processing cores 504, L1/L2 caches 506, a steering unit 508, a fabric bridge 512 and reconfigurable memory controllers 510 in addition to the network compute subsystem 104, server compute subsystem 106, management compute subsystem 108 and the shared resources subsystem 230, as discussed with reference to FIG. 2. The network compute subsystem 104 may include the network compute subsystem multi-core processors 202, L1/L2 caches 204, network compute subsystem cache coherent fabric 206, L3 cache 208, network I/O subsystem 210, network compute subsystem memory controllers 212 and the acceleration unit 214 as discussed with reference to FIG. 2. The server compute subsystem 106 may include the server compute subsystem multi-core processors 216, L1/L2 caches 218, server compute subsystem cache coherent fabric 220, L3 cache 222, server compute subsystem memory controllers 226, boot peripheral devices 228 and the server I/O subsystem 224.

The reconfigurable processing cores 504 may include a plurality of processing cores that can be configured to function as part of the network compute subsystem 104 or as part of the server compute subsystem 106. The L1/L2 caches 506 may include a plurality of L1/L2 caches that can be configured to function as part of the network compute subsystem 104 or as part of the server compute subsystem 106. In some embodiments, each of the L1/L2 caches 506 may be shared by one or more processing cores.

In one embodiment, the management compute subsystem 108 may configure the SoC 502 to assign one or more of the reconfigurable processing cores 504 and L1/L2 caches 506 to the network compute subsystem 104. For example, in the first mode, the SoC 502 may be operated as a network compute subsystem for at least managing network traffic for the host system 110. For example, in some instances, the SoC 502 may be used to provide only network related functionalities such as network traffic shaping, network acceleration, network storage processing, etc. and may not be used to provide compute related services. In some embodiments, at least some of the reconfigurable processing cores 504 and L1/L2 caches 506 may be reconfigured to operate as resources for the network compute subsystem 104. In some embodiments, the SoC 502 may also include reconfigurable L3 or last level caches that may be configured to function as part of the network compute subsystem 104 or as part of the server compute subsystem 106. Thus, the SoC 502 may utilize the dedicated resources associated with the network compute subsystem 104 and the reconfigurable resources steered to the network compute subsystem 104 to provide high performance networking services.

In one embodiment, the management compute subsystem 108 may configure the SoC 502 to assign one or more of the reconfigurable processing cores 504 and L1/L2 caches 506 to the server compute subsystem 106. For example, in the second mode, the SoC 502 may be operated as a server compute subsystem for providing compute services. For example, in some instances, the SoC 502 may be used to provide only server related functionalities such as computing, data processing or providing other virtual or physical resources and may not be used to provide network related services. In some embodiments, at least some of the reconfigurable processing cores 504 and L1/L2 caches 506 may be reconfigured to operate as resources for the server compute subsystem 106. Thus, the SoC 502 may utilize the dedicated resources associated with the server compute subsystem 106 and the reconfigurable resources steered to the server compute subsystem 106 to provide high performance compute services.

The steering unit 508 may be configured to steer one or more memory controllers in the reconfigurable memory controllers 510 to the network compute subsystem 104 or to the server compute subsystem 106. For example, the management compute subsystem 108 can configure the reconfigurable memory controllers 510 to function as part of the network compute subsystem 104 or as part of the server compute subsystem 106 based on the mode of the SoC 502. In some embodiments, the management compute subsystem 108 may be configured to provide control signals to the steering unit 508 to steer the reconfigurable memory controllers 510 to the network compute subsystem 104 in the first mode or to the server compute subsystem 106 in the second mode.

In some embodiments, the steering unit 508 may also be used to steer the reconfigured processing cores 504 and L1/L2 caches 506 to the network compute subsystem 104 (e.g., via the network compute subsystem cache coherent fabric 206) or to the server compute subsystem 106 (e.g., via the server compute subsystem cache coherent fabric 220).

The fabric bridge 506 may represent the routing fabric to map each resource to a physical layer. For example, the fabric bridge 512 can map the reconfigurable processing cores 504 and L1/L2 caches 506 to a physical layer fabric that may be associated with the network compute subsystem 104 or the server compute subsystem 106. In some embodiments, the reconfigurable memory controllers 510 may be mapped to the network compute subsystem 104 or to the server compute subsystem 106 using the fabric bridge 512. In some embodiments of the technology, multiple physical layers may exist where each physical layer can be associated with a coherent fabric for a subsystem. For example, the network compute subsystem cache coherent fabric 206 may represent a first physical layer fabric for the network compute subsystem 104 and the server compute subsystem cache coherent fabric 220 may represent a second physical layer fabric for the server compute subsystem 106. In some embodiments, each of the network compute subsystem cache coherent fabric 206 and the server compute subsystem cache coherent fabric 220 may have ports to attach to the resources. In some embodiments, the fabric bridge 512 may have ports to physically connect to each reconfigurable resources, e.g., via an interface of the resource. The fabric bridge 512 may be configured to map the attached resources to the ports of the respective physical layer fabric. For example, each of the network compute subsystem cache coherent fabric 206 and the server compute subsystem cache coherent fabric 220 may be implemented as a cross bar, a mesh, a ring or any other suitable implementation that can allow attaching the resources that are physically connected to the ports on the fabric bridge 512. Embodiments of the disclosed technology can allow physically isolated physical layer fabrics for each compute subsystem that can reduce the jitter and security risks for both the compute subsystems.

In some embodiments, the network compute subsystem cache coherent fabric 206 may provide reduced jitter and security concerns by isolating all the configured resources for the network compute subsystem 104 to a first physical layer and the server compute subsystem cache coherent fabric 220 may provide reduced jitter and security concerns by isolating all the configured resources for the server compute subsystem 106 to a second physical layer.

FIG. 6A illustrates the SoC 502 configured to operate in the first mode including the reconfigurable resources, according to some embodiments of the disclosed technology.

As illustrated in FIG. 6A, the SoC 502 may include a network compute subsystem 602, the server compute subsystem 106 and the management compute subsystem 108. In some embodiments, the network compute subsystem 602 may include dedicated resources for the network compute subsystem 104 and the reconfigurable processing and memory resources as discussed with reference to FIG. 5. For example, the network compute subsystem 602 may include reconfigured processing cores 504, L1/L2 caches 506, and reconfigured memory controllers 510 in addition to the dedicated processing and memory resources associated with the network compute subsystem 104.

As discussed previously with reference to FIG. 3A, in the first mode, the server compute subsystem 106 may be inactive or de-configured. For example, in some instances, at least some portion of the server compute subsystem 106 may be powered off. In some embodiments, in the first mode, the SoC 502 may be operated as the network compute subsystem 602 including the dedicated resources associated with the network compute subsystem 104 and the reconfigurable processing and memory resources configured to operate as the resources for the network compute subsystem 104. This may allow the SoC 502 to perform high performance networking tasks by utilizing more number of resources.

FIG. 6B illustrates the SoC 502 configured to operate in the second mode according to some embodiments of the disclosed technology.

As illustrated in FIG. 6B, the SoC 502 may include the network compute subsystem 104, a server compute subsystem 604 and the management compute subsystem 108. In some embodiments, the server compute subsystem 604 may include dedicated resources for the server compute subsystem 106 and the reconfigurable processing and memory resources as discussed with reference to FIG. 5. For example, the server compute subsystem 604 may include reconfigured processing cores 504, L1/L2 caches 506, and reconfigured memory controllers 510 in addition to the resources associated with the server compute subsystem 106.

As discussed previously with reference to FIG. 3B, in the second mode, the network compute subsystem 104 may be inactive or de-configured. For example, in some instances, at least some portion of the network compute subsystem 104 may be powered off. In some instances, a small portion of the network compute subsystem 104 may be functional to provide essential networking functionality for the SoC 502. In some embodiments, in the second mode, the SoC 502 may be operated as the server compute subsystem 604 including the dedicated resources associated with the server compute subsystem 106 and the reconfigurable processing and memory resources configured to operate as the resources for the server compute subsystem 106. This may allow the SoC 502 to perform high performance computing tasks by utilizing more number of resources.

FIGS. 7A-7C illustrate a system 700 that may include a first SoC and a second SoC that may be configured to communicate via an interface 710. For example, the interface 710 may be based on a standard interface such as PCIe. The first SoC may be configured to communicate with the second SoC that may be configured in one of the plurality of modes, e.g., in the first mode to operate a network compute subsystem, in the second mode to operate a server compute subsystem or in the third mode to operate both network compute subsystem and the server compute subsystem concurrently.

FIG. 7A illustrates a first SoC that is configured to operate in the second mode to communicate with a second SoC that is configured to operate in the first mode, according to one embodiment of the technology. For example, a first SoC 702 may be configured to operate in the second mode to provide compute services. It will be noted that in some embodiments, the SoC 502 may be used in place of the first SoC 702 or the second SoC 102. However, for illustrative purposes only, the SoC 102 is shown as the second SoC.

As illustrated in FIG. 7A, the first SoC 702 can be similar to the SoC 102 that is configured in the second mode with the network compute subsystem repurposed as a second server compute subsystem. In some embodiments, the SoC 702 may be configured to operate as a general purpose processor in the host system (e.g., host system 110) in the second mode. For example, in some embodiments, a general purpose processor may be able to run on any platform, e.g., any operating system. In some embodiments, a general purpose processor may be capable of performing most of the functionalities of a computer's central processing unit such as general purpose computations and may be capable of supporting a number of networking and messaging protocols. The SoC 702 may include a first server compute subsystem 704, a second server compute subsystem 706 and a management compute subsystem 708. The first server compute subsystem 704 may be similar to the server compute subsystem 106 and the second server compute subsystem 706 may be similar to the second server compute subsystem 414 as discussed previously with reference to FIG. 4B. For example, the second server compute subsystem 706 may be a repurposed network compute subsystem. The management compute subsystem 708 may be similar to the management compute subsystem 108 as discussed previously with reference to FIG. 2.

The SoC 102 may be operated in the first mode as discussed previously with reference to FIG. 3A. For example, in some embodiments, the SoC 102 may be configured to operate the network compute subsystem 104 for at least managing network traffic for the first SoC 702. The server compute subsystem 106 may be inactive or de-configured. In some instances, at least some portion of the server compute subsystem 106 may be powered off. In some embodiments, in the first mode, the SoC 102 may be configured to operate the network compute subsystem 104 on a PCIe device in the SoC 702 operating as a host system. For example, the PCIe device may be part of the server I/O subsystem 224 as discussed with reference to FIG. 2. Thus, in some embodiments, the SoC 102 may operate as a network processor for the SoC 702.

FIG. 7B illustrates a first SoC that is configured to operate in the second mode to communicate with a second SoC that is configured to operate in the second mode, according to one embodiment of the technology. For example, the first SoC 702 may be configured to operate in the second mode to provide compute services as discussed previously with reference to FIG. 7A. In some embodiments, the SoC 702 may be configured to operate as a general purpose processor in the host system (e.g., host system 110) in the second mode.

As illustrated in FIG. 7B, the SoC 102 may be operated in the second mode as discussed previously with reference to FIG. 3B. For example, the SoC 102 may be configured to operate the server compute subsystem 106 for providing compute services. The network compute subsystem 104 may be inactive or de-configured. In some instances, at least some portion of the network compute subsystem 104 may be powered off. In some embodiments, in the second mode, the SoC 102 may be configured to operate the server compute subsystem 106 on a PCIe device in the SoC 702 operating as a host system. For example, the PCIe device may be part of the server I/O subsystem 224 as discussed with reference to FIG. 2. Thus the SoC 702 can be operated as a general purpose processor that can communicate with the server compute subsystem 106 via the PCIe interface. For example, in some embodiments, the server compute subsystem 106 may be used to offload some of the work load of the first SoC 702. In some instances, the first SoC 702 that is configured in the second mode together with the server compute subsystem 106 may provide high performance compute services. For example, the first SoC 702 may focus on processing quick turnaround services and may offload low performance work load to the server compute subsystem 106 thus increasing the throughput of the system.

FIG. 7C illustrates a first SoC that is configured to operate in the second mode to communicate with a second SoC that is configured to operate in the third mode, according to one embodiment of the technology. For example, the first SoC 702 may be configured to operate in the second mode to provide compute services as discussed previously with reference to FIG. 7A. In some embodiments, the SoC 702 may be configured to operate as a general purpose processor in the host system (e.g., host system 110) in the second mode.

As illustrated in FIG. 7C, the SoC 102 may be operated in the third mode as discussed previously with reference to FIG. 3C. For example, the SoC 102 may be configured to operate the network compute subsystem 104 and the server compute subsystem 106 concurrently. Thus the SoC 702 can be operated as a general purpose processor that can communicate with the network compute subsystem 104 and the server compute subsystem 106 via the PCIe interface. In some embodiments, the SoC 702 can communicate with the network compute subsystem 104 via the network I/O subsystem 210 (e.g., interface 236) and with the server compute subsystem 106 via the server I/O subsystem 224 (e.g., interface 238) as discussed previously with reference to FIG. 2.

Figure 8:
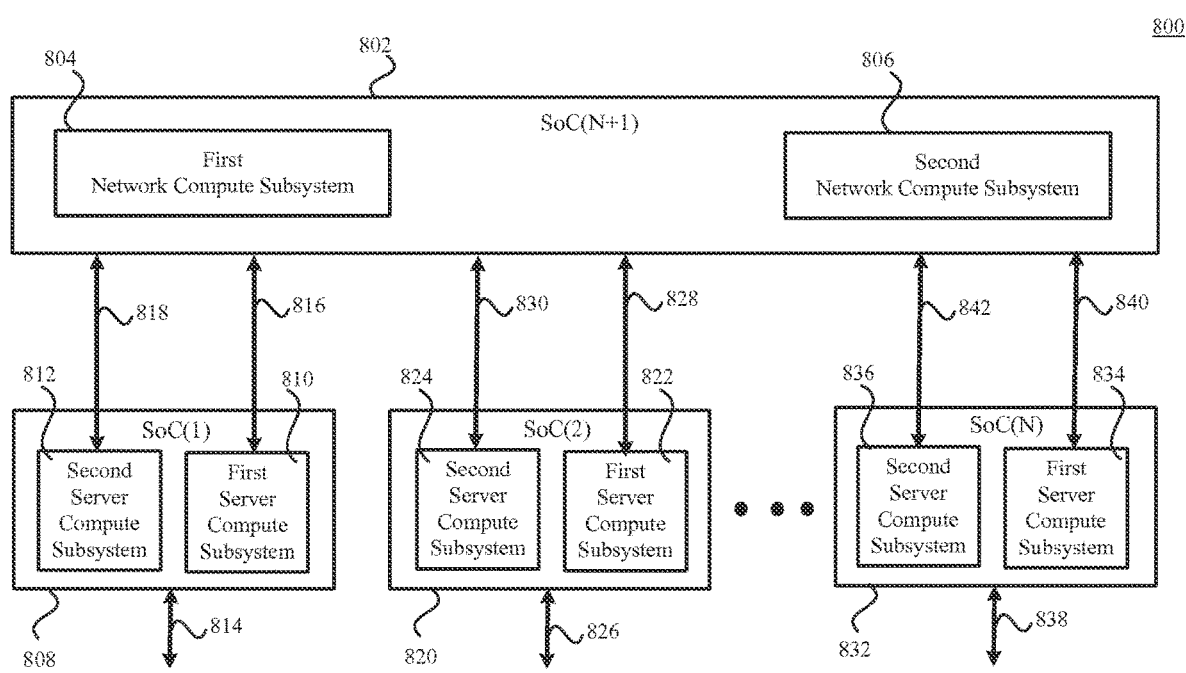
FIG. 8 illustrates a system including a plurality of SoCs, according to one embodiment of the technology.
Figure 9:
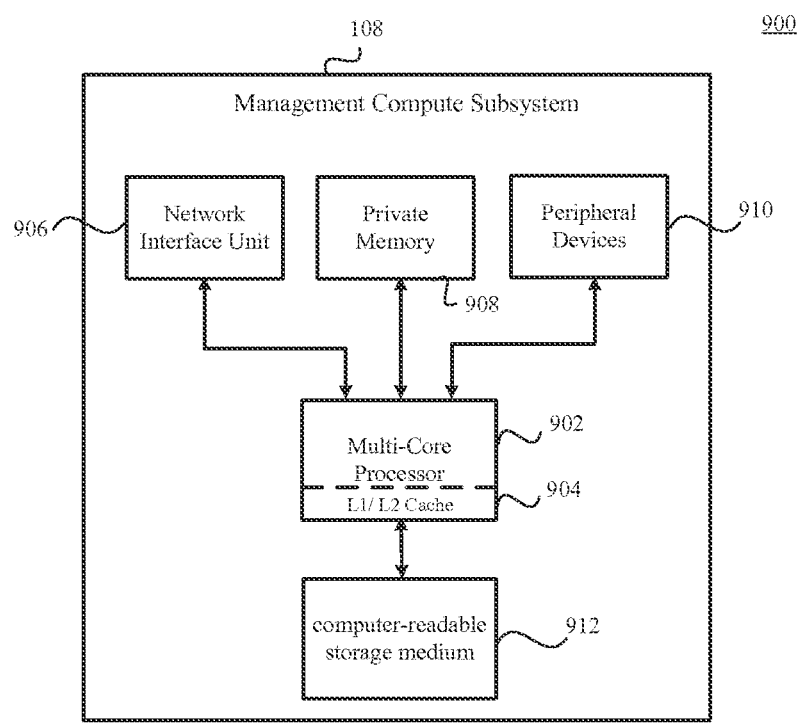
FIG. 9 illustrates a block diagram of a management compute subsystem according to certain embodiments of the technology.

FIG. 8 illustrates a system 800 including a plurality of SoCs, according to one embodiment of the technology. A first SoC can be configured to operate as the network compute subsystem that can be configured to communicate with one or more SoCs using PCIe interfaces, according to one embodiment of the technology. In some embodiments, the first SoC may be configured to communicate with a second SoC that can be a third party SoC, e.g., a SoC including a general purpose processor.

An SoC 802 may be configured in the first mode to operate a network compute subsystem for at least managing network traffic. For example, the SoC 802 may include a first network compute subsystem 804 and a second network compute subsystem 806 as discussed previously with reference to FIG. 4A. The first network compute subsystem 804 may be similar to the first network compute subsystem 404 and may be configured for at least managing network traffic. The second network compute subsystem 806 may be a repurposed server compute subsystem, for example, server compute subsystem 106. The SoC 802 may be configured to provide high performance networking services by utilizing the resources associated with the first network compute subsystem 804 and the second network compute subsystem 806.

In some embodiment, the SoC 802 may be operated as a network processor for one or more servers. For example, the SoC 802 may be configured to communicate with one or more SoCs that are configured as server subsystems, for example, an SoC 808, an SoC 820 and an SoC 832. For example, each of the SoCs 808, 820 and 832 may be configured to operate in the second mode to operate as a server compute subsystem for providing compute services. The SoC 808 may include a first server compute subsystem 810 and a second server compute subsystem 812. For example, the second server compute subsystem 812 may be a repurposed network compute subsystem as discussed previously with reference to 4B. The SoC 820 may include a first server compute subsystem 822 and a second server compute subsystem 824, wherein the second server compute subsystem 824 may be a repurposed network compute subsystem. The SoC 832 may include a first server compute subsystem 834 and a second server compute subsystem 836, wherein the second server compute subsystem 836 may be a repurposed network compute subsystem. Note that SoCs 808, 820 and 832 may include same or different configuration of processing and memory resources. Further, in some embodiments, any of the SoCs 808, 820 and 832 may include only one server compute subsystem (e.g., other server compute subsystem may be inactive). In some embodiments, one or more of the SoCs 808, 820 and 832 may be similar to the SoC 502, as discussed with reference to FIG. 6B.

The SoC 808 may include an interface 816 between the first server compute subsystem 810 and the SoC 802, and an interface 818 between the second server compute subsystem 818 and the SoC 802. In some embodiments, the interfaces 816 and 818 may be PCIe or Ethernet interfaces. The SoC 808 may also include an interface 814 for external memory such as Solid State Drives, DRAMs, etc. (not shown). In some embodiments, the interface 814 may be PCIe interface. The SoC 808 may also include interfaces for other I/O devices such as SATA controllers, GPIO, I2C, etc. The SoC 820 may include interfaces 826, 828 and 830 and the SoC 832 may include interfaces 838, 840 and 842. The interfaces for the SoC 820 and the SoC 832 may be similar to the respective interfaces for the SoC 808. In some embodiments, the SoC 808, 820 and 832 may be instances of the same SoC or may be different SoCs.

In some embodiments, the SoC 802 may be configured to communicate with a SoC provided by third party (e.g., general purpose SoCs such as the SoCs based on ARM® servers). For example, in some embodiments, the SoC 802 may communicate with up to four or eight SoCs using PCIe x4/x8 slot. In some embodiments, the SoC 802 and SoCs 808, 820, 832 may include other components such as a management compute subsystem, a shared resources subsystem, etc. as discussed previously with reference to FIG. 2, which are not shown in FIG. 8 for the purpose of simplicity.

The management compute subsystem 108 may include a multi-core processor 902, an L1/L2 cache 904, a network interface unit 906, private memory 908, peripheral devices 910 and a computer-readable storage medium 912.

The multi-core processor 902 may include two or more processor cores such as A57 by ARM®. In some embodiments, a single core processor may be used in place of the multi-core processor 902. The L1/L2 cache 904 may be internal or external to the multi-core processor 902 and may be shared by all the processor cores. The multi-core processor 902 may be configured to execute a plurality of instructions that may be stored on the computer-readable storage medium 912. For example, the computer-readable medium may include instructions to configure a SoC (e.g., SoC 102) to operate in one of the plurality of modes, e.g., the first mode, second mode or the third mode. The computer-readable storage medium 912 may be non-transitory. In some embodiments, the computer-readable storage media may include but are not limited to, parameter random access memory (PRAM), SRAM, DRAM, RAM, read only memory (ROM), electrically erasable programmable read-only memory (EEPROM), flash memory or other memory technology, compact disc (CD)-ROM, digital video disk (DVD) or other optical storage, magnetic cassettes, magnetic tape, magnetic disk storage or other magnetic storage devices, or any other medium which can be used to store the desired information and which can be accessed by multi-core processor 902. In some embodiments, the computer-readable storage medium 912 may be part of the peripheral devices 910. The L1/L2 cache 904 may be data cache for temporary storage of data.

The network interface unit 906 may allow the management compute subsystem 108 to connect to a network. For example, the network interface unit 906 may include an Ethernet MAC (Medium Access Control) that can enable the management compute subsystem 108 to connect to a network such as the Ethernet. In some instances, the Ethernet MAC may provide an Ethernet port to interface to a PHY (physical layer) device for connecting to a network. In some embodiments, the management compute subsystem 108 can communicate with an external entity or a system over the network to determine the mode for configuring a SoC.

The private memory 908 may include memory for private use of the management compute subsystem 108. The private memory 908 may include volatile memory such as random access memory (e.g., SRAM or DRAM). For example, the management compute subsystem 108 may use the private memory 908 for temporary storage of data.

The peripheral devices 910 may include private peripheral devices for the management compute subsystem 108. In some embodiments, some of the private peripheral devices 910 may include devices for reboot and power management of different subsystems of the SoC 102. For example, the peripheral devices 910 may include a trusted management module including boot firmware that can execute at power-on to establish a root-of-trust before powering on other subsystems. In some embodiments, power management may be provided through voltage manipulation, clock manipulation or any other suitable method.

In some embodiments, the management compute subsystem 108 may be configured to power down at least some portions of the network compute subsystem 104 or the server compute subsystem 106 based on the mode. For example, in one embodiment, in the first mode, the SoC 102 may operate the network compute subsystem 104 and therefore at least some portions of the server compute subsystem 106 may be powered down, e.g., compute intensive logic that may not be utilized. Similarly, in another embodiment, in the second mode, the SoC 102 may operate the server compute subsystem 106 and therefore at least some portions of the network compute subsystem 104 may be powered down, e.g., network intensive logic that may not be utilized.

In some embodiments, the management compute subsystem 108 may be configured to be the first to run upon a cold power on of the entire SoC 202. In some instances, the management compute subsystem 108 may be powered on first to establish a root-of-trust for the other subsystems before they are powered on. For example, the boot processes for the network compute subsystem 104 and the server compute subsystem 106 may be considered hierarchically under the core boot for the management compute subsystem 108. In some embodiments, the software that would subsequently run on the network compute subsystem 104 and the server compute subsystem 106 may have been authenticated by the management compute subsystem 108 as having been signed using a private key associated with the host system 114 or a particular service provided by the host system 114. This can allow both the network compute subsystem 104 and the server compute subsystem 106 processes to boot via trusted and independent boot loaders.

In some embodiments, the management compute subsystem 108 may be reset/rebooted with a separate reset line without affecting the live operation of both the network compute subsystem 104 and the server compute subsystem 106.

The network I/O subsystem 210 may include a bus interface unit 1002, a network interface unit 1004 and an I/O peripherals unit 1006.

The bus interface unit 1002 may include one or more bus interfaces for communication with internal or external components. For example, the bus interface unit 1002 may include a first interface to communicate with the host system 110, e.g., interface 236. In some embodiments, the first interface may be a PCIe interface. For example, the bus interface unit 1002 may include one or more PCIe ports to connect to other PCIe ports. The bus interface unit 1002 may include a Root Complex (RC) port and an EndPoint port (EP). In some embodiments, the network compute subsystem 104 may communicate with the host system 110 via a PCIe port in the network I/O subsystem 210 and a PCIe port in the host system 110 using the interface 236. In some embodiments, the SoC 102 is configured to operate as the network compute subsystem 104 in the first mode on the PCIe device in the host system 110. The bus interface unit 1002 may include a second interface to connect with the server compute subsystem 106, e.g., interface 234. For example, the interface 234 may be a PCIe interface and the bus interface unit 1002 may connect to a PCIe port in the server I/O subsystem 224 via the PCIe interface.

The network interface unit 1004 may include a third interface to connect to a network. In some embodiments, the network interface unit 1004 may include one or more Ethernet MACs (e.g., 10/25/40/50 Gb/sec) to connect to an Ethernet network. In some instances, the Ethernet MACs may provide Ethernet ports to interface to a PHY (physical layer) device for connecting to a network.

The I/O peripherals unit 1006 may include one or more peripheral devices. For example, the I/O peripherals unit 1006 may include one or more peripheral devices such as UARTs, I2C, GPIOs, SATA controllers, SERDES (Serialize-De-serialize) interface, etc.

The server I/O subsystem 224 may include a bus interface unit 1102, a network interface unit 1104 and an I/O peripherals unit 1106.

The bus interface unit 1102 may include one or more bus interfaces for communication with internal or external components. For example, the bus interface unit 1102 may include a first interface to communicate with the host system 110, e.g., interface 238. In some embodiments, the first interface may be a PCIe interface. For example, the bus interface unit 1102 may include one or more PCIe ports to connect to other PCIe ports. The bus interface unit 1102 may include a Root Complex (RC) port and an EndPoint port (EP). In some embodiments, the server compute subsystem 106 may communicate with the host system 110 via a PCIe port in the server I/O subsystem 224 and a PCIe port in the host system 110 using the interface 238. In some embodiments, the SoC 102 is configured to operate the server compute subsystem 106 in the second mode on the PCIe device in the host system 110. The bus interface unit 1102 may include a may include a second interface to connect with the network compute subsystem 104, e.g., interface 234. For example, the bus interface unit 1102 may connect to a PCIe port in the network I/O subsystem 210 via the PCIe interface.

The network interface unit 1104 may include a third interface to connect to a network. In some embodiments, the network interface unit 1104 may include one or more Ethernet MACs (e.g., 10/25/40/50 Gb/sec) to connect to an Ethernet network. In some instances, the Ethernet MACs may provide Ethernet ports to interface to a PHY (physical layer) device for connecting to a network.

Figure 10:
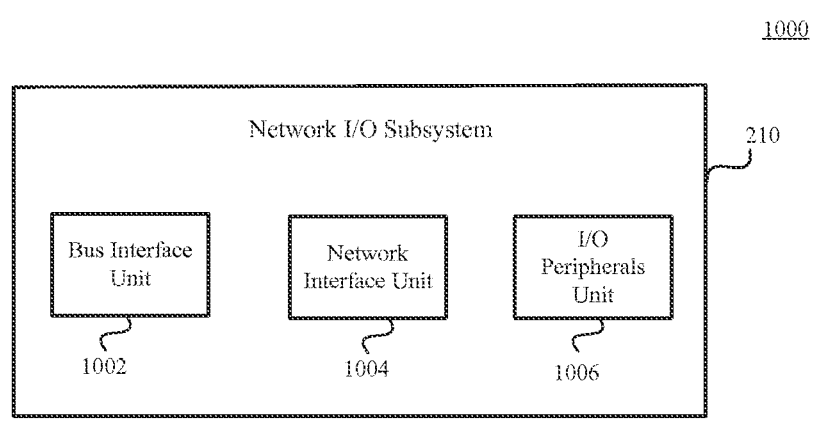
FIG. 10 illustrates a block diagram of a network I/O subsystem according to certain embodiments of the technology.
Figure 11:
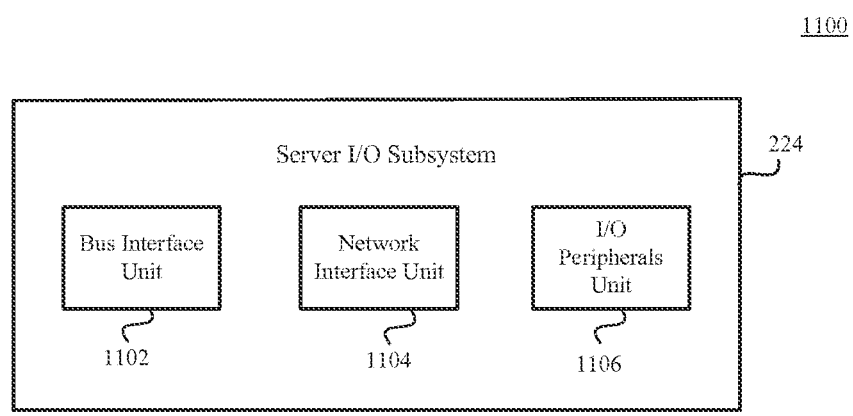
FIG. 11 illustrates a block diagram of a server I/O subsystem according to certain embodiments of the technology.
Figure 12:
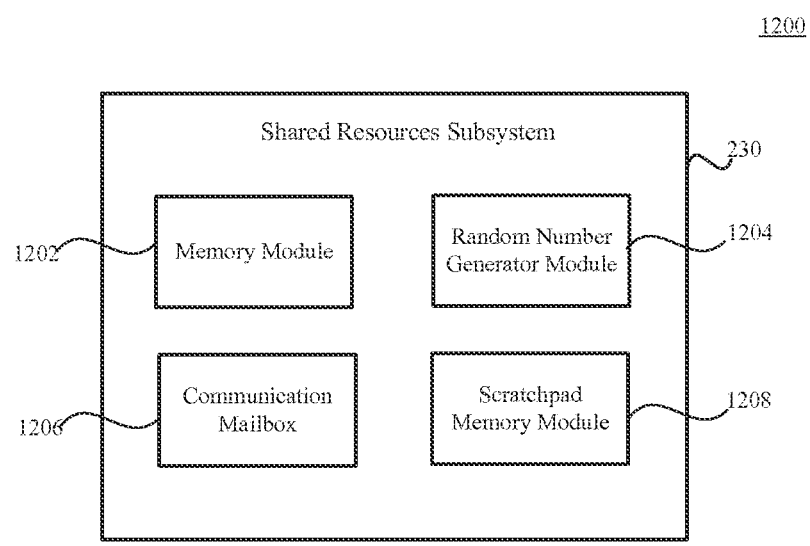
FIG. 12 illustrates a block diagram of the shared resources subsystem according to certain embodiments of the technology.

The I/O peripherals unit 1106 may include one or more peripheral devices. For example, the I/O peripherals unit 1106 may include one or more peripheral devices such as UARTs, I2C, GPIOs, SATA controllers, SERDES (Serialize-De-serialize) interface, etc. In some embodiments, the I/O peripherals unit 906 may include different types and numbers of I/O devices than the I/O peripherals unit 1006 discussed with reference to FIG. 10. For example, in some instances, the I/O peripherals unit 1106 may include more number of SATA controllers as compared to I/O peripherals unit 1006. In some instances, only the I/O peripherals unit 1106 may include GPIOs and only the I/O peripherals unit 1006 may include UARTs.

In embodiments of the technology, the shared resources subsystem 230 may include components that may not include process states. The shared resources subsystem 230 may include a memory module 1202, a random generator module 1204, a communication mailbox 1206 and a scratchpad memory module 1208.

The memory module 1202 may include non-volatile memory storage such as flash memory. For example, the memory module 1202 may include an embedded multimedia controller (eMMC) or secure digital (SD) to provide low level flash memory management. In some embodiments, the memory module 1202 may be used to store control code e.g., BIOS (Basic Input/Output System), boot loader, etc. For example, the memory module 1202 may include code that may be shared by both the compute subsystems.

The random generator module 1204 may be configured to generate a random sequence of numbers or symbols. For example, the random numbers may be used for cryptographic applications such as encryption of data or any such applications. In some embodiments, the random generator module 1204 may be used to generate a random number or sequence that may be used by the management compute subsystem 108 for authentication of each compute subsystem before powering up each compute subsystem after power on or reboot.

The communication mailbox 1206 may be used to facilitate communication among different processes associated with the two subsystems. For example, the communication mailbox 1206 may be used as an inter-process communication module for exchange of data for various functions such as message passing, synchronization, shared memory and remote procedure calls (RPC).

The scratchpad memory module 1208 may be used for temporary storage of data that may be used by both the subsystems. In some embodiments, the scratchpad memory module 1208 may include a high speed memory (e.g., 2 MB SRAM) to store small amounts of data for rapid retrieval, e.g., instructions or intermediate values.

Embodiments of the disclosed technology can provide various configurations and modes for operating a System on a Chip (SoC). In different embodiments of the disclosed technology, the SoC may be operated in a first mode to provide networking services only, in a second mode to provide compute services only or in a third mode to provide both networking and compute services concurrently. In some embodiments, a first compute subsystem may be repurposed as a second compute subsystem to provide high performance networking services or high performance compute services. In some embodiments, reconfigurable processing and memory resources can be steered to the first compute subsystem or to the second compute subsystem depending on the mode the SoC is operating in. In some other embodiments, processing and memory resources of the de-configured compute subsystem may be reconfigured to operate as resources for the active compute subsystem. Thus, various embodiments of the disclosed technology can allow efficient utilization of the resources to provide high performance networking services or high performance computing services. Further, some embodiments of the disclosed technology provide a system including a plurality of SoCs wherein a first SoC can be configured as a network processor in the first mode and a second SoC can be configured as a server in the second mode.

Figure 13:
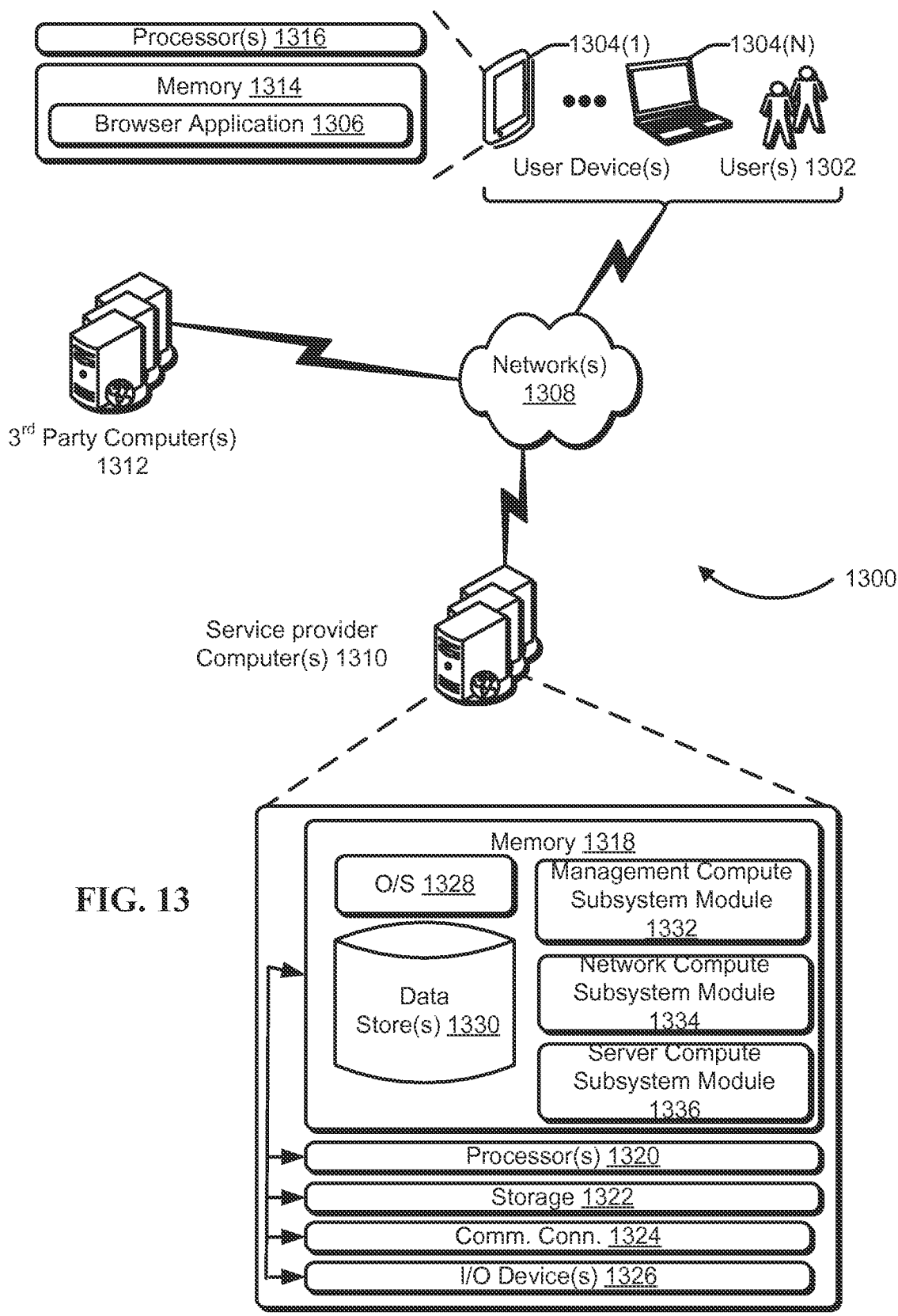
FIG. 13 illustrates an exemplary architecture for features and systems described herein that includes one or more service provider computers and/or a user device connected via one or more networks, according to at least one exemplary embodiment.

FIG. 13 illustrates an exemplary architecture for features and systems described herein that includes one or more service provider computers and/or a user device connected via one or more networks, according to at least one exemplary embodiment. The devices discussed in FIGS. 1-12, may use one or more components of the computing devices described in FIG. 13 or may represent one or more computing devices described in FIG. 13. In architecture 1300, one or more users 1302 may utilize user computing devices 1304(1)-(N) (collectively, user devices 1304) to access application 1306 (e.g., a web browser or mobile device application), via one or more networks 1308. In some aspects, application 1306 may be hosted, managed and/or provided by a computing resources service or service provider. One or more service provider computers 1310 may provide a native application which is configured to run on user devices 1304 which user(s) 1302 may interact with. Service provider computer(s) 1310 may, in some examples, provide computing resources such as, but not limited to, client entities, low latency data storage, durable data storage, data access, management, virtualization, cloud-based software solutions, electronic content performance management, etc. Service provider computer(s) 1310 may also be operable to provide web hosting, computer application development and/or implementation platforms, combinations of the foregoing or the like to user(s) 1302. Service provider computer(s) 1310, in some examples, may communicate with one or more third party computers 1312.

In some examples, network(s) 1308 may include any one or a combination of many different types of networks, such as cable networks, the Internet, wireless networks, cellular networks and other private and/or public networks. While the illustrated example represents user(s) 1302 accessing application 1306 over network(s) 1308, the described techniques may equally apply in instances where user(s) 1302 interact with service provider computer(s) 1310 via user device(s) 1304 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 1306 may allow user(s) 1302 to interact with service provider computer(s) 1310 such as to access web content (e.g., web pages, music, video, etc.). Service provider computer(s) 1310, perhaps arranged in a cluster of servers or as a server farm, may host application 1306 and/or cloud-based software services. Other server architectures may also be used to host application 1306. Application 1306 may be capable of handling requests from many users 1302 and serving, in response, various item web pages. Application 1306 can provide any type of website that supports user interaction, including social networking sites, online retailers, informational sites, blog sites, search engine sites, news and entertainment sites and so forth. As discussed above, the described techniques can similarly be implemented outside of application 1306, such as with other applications running on user device(s) 1304.

User device(s) 1304 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1304 may be in communication with service provider computer(s) 1310 via network(s) 1308, or via other network connections. Additionally, user device(s) 1304 may be part of the distributed system managed by, controlled by or otherwise part of service provider computer(s) 1310 (e.g., a console device integrated with service provider computers 1310).

In one illustrative configuration, user device(s) 1304 may include at least one memory 1314 and one or more processing units (or processor(s)) 1316. Processor(s) 1316 may be implemented as appropriate in hardware, computer-executable instructions, firmware, or combinations thereof. Computer-executable instruction or firmware implementations of processor(s) 1316 may include computer-executable or machine-executable instructions written in any suitable programming language to perform the various functions described. User device(s) 1304 may also include geo-location devices (e.g., a global positioning system (GPS) device or the like) for providing and/or recording geographic location information associated with user device(s) 1304.

Memory 1314 may store program instructions that are loadable and executable on processor(s) 1316, as well as data generated during the execution of these programs. Depending on the configuration and type of user device(s) 1304, memory 1314 may be volatile (such as random access memory (RAM)) and/or non-volatile (such as read-only memory (ROM), flash memory, etc.). User device(s) 1304 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 1314 may include multiple different types of memory, such as static random access memory (SRAM), dynamic random access memory (DRAM), or ROM.

Turning to the contents of memory 1314 in more detail, memory 1314 may include an operating system and one or more application programs or services for implementing the features disclosed herein including at least a user provided input element or electronic service web page, such as via browser application 1306 or dedicated applications (e.g., smart phone applications, tablet applications, etc.). Browser application 1306 may be configured to receive, store and/or display a website or other interface for interacting with service provider computer(s) 1310. Additionally, memory 1314 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1304.

In some aspects, service provider computer(s) 1310 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 1310 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1310 may be in communication with user device(s) 1304 and/or other service providers via network(s) 1308, or via other network connections. Service provider computer(s) 1310 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 1310 may include at least one memory 1318 and one or more processing units (or processor(s)) 1320. Processor(s) 1320 may be implemented as appropriate in hardware, computer-executable instructions, firmware or combinations thereof. Computer-executable instruction or firmware implementations of processor(s) 1320 may include computer-executable or machine-executable instructions written in any suitable programming language to perform the various functions described.

In some instances, hardware processor(s) 1320 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 1318 may store program instructions that are loadable and executable on processor(s) 1320, as well as data generated during the execution of these programs. Depending on the configuration and type of service provider computer(s) 1310, memory 1318 may be volatile (such as RAM) and/or non-volatile (such as ROM, flash memory, etc.). Service provider computer(s) 1310 or servers may also include additional storage 1322, which may include removable storage and/or non-removable storage. The additional storage 1322 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 1318 may include multiple different types of memory, such as SRAM, DRAM, or ROM.

Memory 1318, the additional storage 1322, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 1318 and the additional storage 1322 are all examples of computer storage media. Additional types of computer storage media that may be present in service provider computer(s) 1310 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1310. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1310 may also contain communications connection(s) 1324 that allow service provider computer(s) 1310 to communicate with a stored database, another computing device or server, user terminals and/or other devices on network(s) 1308. Service provider computer(s) 1310 may also include I/O device(s) 1326, such as a keyboard, a mouse, a pen, a voice input device, a touch input device, a display, speakers, a printer and the like.

Memory 1318 may include an operating system 1328, one or more data stores 1330 and/or one or more application programs or services for implementing the features disclosed herein, including optionally a management compute subsystem module 1332, a network compute subsystem module 1334 and a server compute subsystem module 1336. The modules described herein may be software modules, hardware modules or a suitable combination thereof. If the modules are software modules, the modules can be embodied on a non-transitory computer readable medium and processed by a processor in any of the computer systems described herein. In some embodiments, referring back to FIG. 2, the management compute subsystem module 1332 can include the functionalities of the management compute subsystem 108, the network compute subsystem module 1334 can include the functionalities of the network compute subsystem 104 and the server compute subsystem module 1336 can include the functionalities of the server compute subsystem 106. It should be noted that the described processes and architectures can be performed either in real-time or in an asynchronous mode prior to any user interaction. The modules may be configured in the manner suggested in FIG. 13, and/or functions described herein can be provided by one or more modules that exist as separate modules and/or module functions described herein can be spread over multiple modules.

Figure 14:
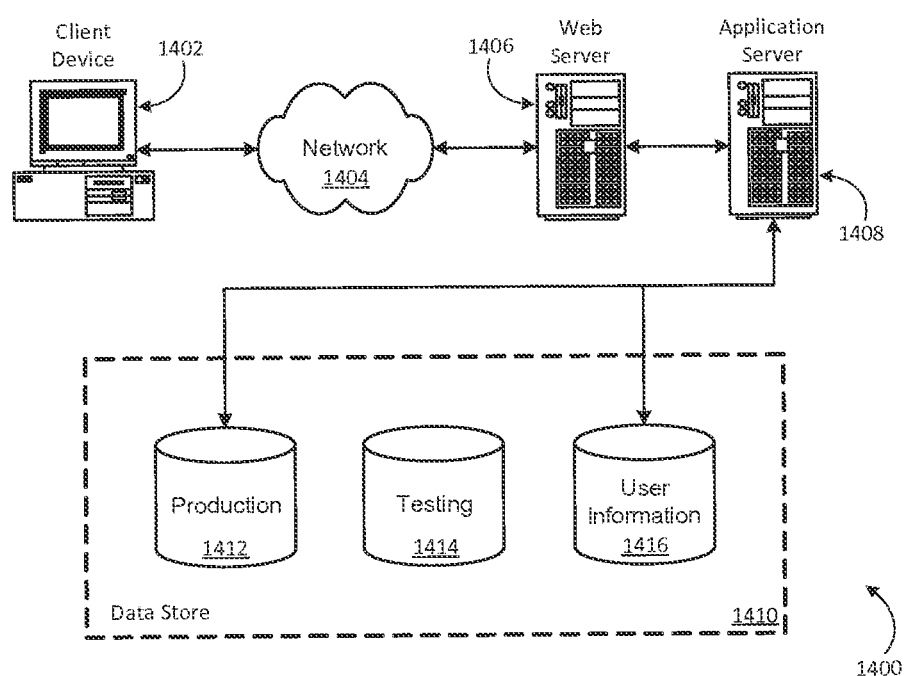
FIG. 14 illustrates an environment in which various embodiments can be implemented.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes an electronic client device 1402, which can include any appropriate device operable to send and receive requests, messages or information over an appropriate network 1404 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log data 1414, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C#or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system on a chip (SoC) comprising:
    a management compute subsystem comprising a processor, memory and a network interface, wherein the network interface is configured to connect to a remote entity over a network and wherein the management compute subsystem is configured to execute instructions from the memory on the processor to operate the SoC in one of a plurality of modes;
    a network compute subsystem comprising a first set of processing cores, caches, and memory controllers and configured to execute instructions for managing network traffic for a host system external to the SoC, the managing of the network traffic for the host system including monitoring and shaping of network traffic between the host system and a client computer, and the first set of processing cores, caches, and memory controllers forming a first set of resources that are pre-allocated to the network compute subsystem; and
    a server compute subsystem comprising a second set of processing cores, caches, and memory controllers and configured to execute instructions for providing compute services to the client computer, the second set of processing cores, caches, and memory controllers forming a second set of resources that are separate from the first set of resources and pre-allocated to the server compute subsystem,
    wherein
        in a first mode, the SoC is configured by the management compute subsystem to operate the network compute subsystem,
        in a second mode, the SoC is configured by the management compute subsystem to operate the server compute subsystem,
        in a third mode, the SoC is configured by the management compute subsystem to operate the network compute subsystem and the server compute subsystem concurrently, with the network compute subsystem being configured to manage network traffic for the host system and manage network traffic for the server compute subsystem,
        in the first mode, the management compute subsystem prevents the server compute subsystem from providing the compute services by deactivating or repurposing the second set of processing cores, caches, and memory controllers, and
        in the second mode, the management compute subsystem prevents the network compute subsystem from managing the network traffic for the host system by deactivating or repurposing the first set of processing cores, caches, and memory controllers.

2. The SoC of claim 1, wherein in the second mode the SoC is further configured to repurpose the network compute subsystem as a second server compute subsystem.

3. The SoC of claim 1, the SoC further comprising reconfigurable processing and memory resources, wherein the SoC is further configured to assign at least a portion of the reconfigurable processing and memory resources to operate as resources for the server compute subsystem in the second mode or to operate as resources for the network compute subsystem in the first mode.

4. The SoC of claim 1, wherein the network compute subsystem includes a first interface to communicate with the host system, a second interface to communicate with the server compute subsystem and a third interface to communicate with a network.

5. The SoC of claim 1, wherein the first mode, the second mode, and the third mode are operational modes, and wherein the management compute subsystem determines which operational mode the SoC will use based on a hardware configuration, a software configuration, or a policy.

6. The SoC of claim 5, wherein the determination of which operational mode the SoC will use is performed at power-up.

7. A system on a chip (SoC) configured to:
    operate in one of a plurality of modes, wherein
        in a first mode, the SoC is configured to operate a network compute subsystem for managing network traffic by executing instructions on a first set of processing and memory resources, the managing including monitoring and shaping of traffic between a host system and a client computer, the host system being communicatively coupled to the SoC, and the first set of processing and memory resources being pre-allocated to the network compute subsystem,
        in a second mode, the SoC is configured to operate a server compute subsystem for providing compute services to the client computer by executing instructions on a second set of processing and memory resources, the second set of processing and memory resources being pre-allocated to the server compute subsystem and separate from the first set of processing and memory resources, and
        in a third mode, the SoC is configured to operate the network compute subsystem and the server compute subsystem concurrently, with the network compute subsystem being configured to manage network traffic for the server compute subsystem,
    the SoC comprising a management compute subsystem, wherein the management compute subsystem is configured to configure the SoC in one of the plurality of modes by executing instructions on a processor, wherein in the first mode, the management compute subsystem prevents the server compute subsystem from providing the compute services by deactivating or repurposing the second set of processing and memory resources, and wherein in the second mode, the management compute subsystem prevents the network compute subsystem from managing the network traffic by deactivating or repurposing the first set of processing and memory resources.

8. The SoC of claim 7, wherein in the first mode, the SoC is configured to operate the network compute subsystem on a Peripheral Component Interconnect Express (PCIe) device in the host system.

9. The SoC of claim 7, wherein in the second mode, the SoC is configured to operate the server compute subsystem on a Peripheral Component Interconnect Express (PCIe) device in the host system.

10. The SoC of claim 7, wherein in the second mode, the SoC is configured to operate as a general purpose processor in the host system.

11. The SoC of claim 7, wherein in the second mode, the SoC is further configured to reconfigure the first set of processing and memory resources to operate as resources for the server compute subsystem.

12. The SoC of claim 7, wherein the SoC is further configured to repurpose the network compute subsystem as a second server compute subsystem in the second mode.

13. The SoC of claim 7, the SoC comprising reconfigurable processing and memory resources, wherein the SoC is further configured to assign at least a portion of the reconfigurable processing and memory resources to the network compute subsystem in the first mode.

14. The SoC of claim 7, the SoC comprising reconfigurable processing and memory resources, wherein the SoC is further configured to assign at least a portion of the reconfigurable processing and memory resources to the server compute subsystem in the second mode.

15. The SoC of claim 7, wherein in the third mode, the SoC is further configured to operate the server compute subsystem as a second host system and to operate the network compute subsystem to manage network traffic for the second host system.

16. The SoC of claim 7, wherein
the first set of processing and memory resources includes a first processing core, a first cache, and a first memory controller, and
the second set of processing and memory resources includes a second processing core, a second cache, and a second memory controller.

17. A system comprising:
a plurality of System-on-Chips (SoCs), the plurality of SoCs comprising a first SoC and a second SoC, the second SoC communicatively coupled to the first SoC, wherein the first SoC is configured to operate in one of a plurality of modes, and wherein
in a first mode, the first SoC is configured to operate a first network compute subsystem by executing instructions on a first set of processing resources from a first set of memory resources, the first set of processing resources and the first set of memory resources being pre-allocated to the first network compute subsystem, wherein instructions executed on the first set of processing resources cause the first network compute subsystem to monitor and shape network traffic between a host system and a client computer, the host system being communicatively coupled to the first SoC,
in a second mode, the first SoC is configured to operate a first server compute subsystem by executing instructions on a second set of processing resources from a second set of memory resources, the second set of processing resources and the second set of memory resources being pre-allocated to the first server compute subsystem and separate from the first set of processing resources and the first set of memory resources, wherein the instructions executed on the second set of processing resources cause the first server compute subsystem to provide compute services to the client computer, and
in a third mode, the first SoC is configured to operate the first network compute subsystem and the first server compute subsystem concurrently, the first SoC comprising a first management compute subsystem, wherein the first management compute subsystem is configured to execute instructions on a third set of processing resources from a third set of memory resources to configure the first SoC in one of the plurality of modes,
in the first mode, the first management compute subsystem prevents the first server compute subsystem from providing compute services by deactivating or repurposing the second set of processing resources and the second set of memory resources, and
in the second mode, the first management compute subsystem prevents the first network compute subsystem from managing network traffic by deactivating or repurposing the first set of processing resources and the first set of memory resources.

18. The system of claim 17, wherein the second SoC is also configured to operate in one of the plurality of modes, and wherein
in the first mode, the second SoC is configured to operate a second network compute subsystem, the second network compute subsystem comprising a fourth set of processing and memory resources,
in the second mode, the second SoC is configured to operate a second server compute subsystem, the second server compute subsystem comprising a fifth set of processing and memory resources, and
in the third mode, the second SoC is configured to operate the second network compute subsystem and the second server compute subsystem concurrently.

19. The system of claim 18, wherein the first SoC is configured in the first mode and the second SoC is configured in the second mode with the second network compute subsystem repurposed as a third server compute subsystem, and wherein the first SoC is further configured to reconfigure the second set of processing and memory resources to operate as resources for the first network compute subsystem.

20. The system of claim 17, wherein the second SoC is a general purpose SoC.

* * * * *

UNITED STATES PATENT AND TRADEMARK OFFICE
CERTIFICATE OF CORRECTION

PATENT NO. : 11,200,192 B2
APPLICATION NO. : 14/622661
DATED : December 14, 2021
INVENTOR(S) : David James Borland and Mark Bradley Davis It is certified that error appears in the above-identified patent and that said Letters Patent is hereby corrected as shown below:

On the Title Page

Item (73) Assignee: change "Amazon Technologies. Iac." to --Amazon Technologies, Inc.--.

Signed and Sealed this
Twenty-sixth Day of April, 2022

Katherine Kelly Vidal
Director of the United States Patent and Trademark Office